US009703857B2

(12) United States Patent
Glimcher et al.

(10) Patent No.: US 9,703,857 B2
(45) Date of Patent: *Jul. 11, 2017

(54) DIGITAL CATALOGUE RAISONEÉ PLATFORM

(71) Applicant: Artifex Press LLC, New York, NY (US)

(72) Inventors: Andrea Kristin Glimcher, New York, NY (US); Marc Cooper Glimcher, New York, NY (US); David Matthew Grosz, Brooklyn, NY (US)

(73) Assignee: Artifex Press LLC, New York, NY (US)

( * ) Notice: Subject to any disclaimer, the term of this patent is extended or adjusted under 35 U.S.C. 154(b) by 39 days.

This patent is subject to a terminal disclaimer.

(21) Appl. No.: 14/444,399

(22) Filed: Jul. 28, 2014

(65) Prior Publication Data
US 2014/0337325 A1 Nov. 13, 2014

Related U.S. Application Data

(63) Continuation of application No. 13/346,763, filed on Jan. 10, 2012.
(Continued)

(51) Int. Cl.
G06F 21/62 (2013.01)
G06F 17/30 (2006.01)
G06Q 30/06 (2012.01)

(52) U.S. Cl.
CPC .... *G06F 17/30607* (2013.01); *G06F 17/3089* (2013.01); *G06F 17/30554* (2013.01);
(Continued)

(58) Field of Classification Search
CPC ............ G06F 21/6218; G06F 21/6272; G06F 21/6227; G06F 17/20607; G06F 17/30554; G06F 17/3089; G06Q 30/0603
See application file for complete search history.

(56) References Cited

U.S. PATENT DOCUMENTS 7,797,271 B1 * 9/2010 Bonneau ........... G06F 17/30873
705/26.8
2008/0222074 A1 * 9/2008 Lieberwirth et al. ........... 706/50
(Continued)

OTHER PUBLICATIONS

"NetXposure Core 5.0 Administration Guide" reference created Apr. 10, 2008; observed Nov. 19, 2010 by Google (146 pages) http://www.arboretum.harvard.edu/wp-content/uploads/IP5_AdminGuide.pdf.*
(Continued)

*Primary Examiner* — Joseph P Hirl
*Assistant Examiner* — Thomas Gyorfi
(74) *Attorney, Agent, or Firm* — Fitzpatrick, Cella, Harper & Scinto

(57) ABSTRACT

A content management system for creating a digital catalog raisonné includes at least one computer, a public user interface, a private catalog raisonné manager, and a private user interface. The private catalog raisonné manager is configured to instruct at least one object-oriented database to store first digital data for at least one artist, the first digital data including at least one of an image of an artwork of the at least one artist and a description of the artwork. The private user interface is configured to receive the first digital data, transmit information permitting a user to provide a command to the content management system to make available, at the public user interface, a public catalog raisonné including the first digital data, and receive the command to make available the public catalog raisonné.

17 Claims, 24 Drawing Sheets

Related U.S. Application Data

(60) Provisional application No. 61/495,198, filed on Jun. 9, 2011.

(52) U.S. Cl.
CPC ...... *G06F 21/6218* (2013.01); *G06F 21/6227* (2013.01); *G06Q 30/0603* (2013.01)

(56) References Cited

U.S. PATENT DOCUMENTS

| | | | | |
|---|---|---|---|---|
| 2008/0263103 A1* | 10/2008 | McGregor et al. | | 707/200 |
| 2009/0265371 A1* | 10/2009 | Faggionato | | 707/102 |
| 2010/0185543 A1* | 7/2010 | Saile et al. | | 705/38 |
| 2011/0246212 A1* | 10/2011 | Barnes | | 705/1.1 |

OTHER PUBLICATIONS

"NetXPosure Success Story: MoMA New York" ©2007 NetXposure; observed May 9, 2008 by Internet Archive (3 pages) http://web.archive.org/web/20080509162809/http://www.netx.net/moma.jsp.*

"Content Management System User Guide" reference created Jun. 2, 2009; observed Jun. 23, 2009 by Google (91 pages) http://www.covisint.com/robohelp/cm_hc/HC_CMS_User_Guide.pdf.*

Elana Carpinone. "Museum Collections Management Systems: One Size Does Not Fit All" Published May 2010 (157 pages) http://0338c93.netsolhost.com/cms/wp-content/uploads/2011/05/Graduate-Studies-Thesis-Collections-Management-Elana-Carpinone.pdf.*

* cited by examiner

100

| | | Venue Record (Library) |
|---|---|---|
| | | ID |
| | | Last Saved/Record Creator |
| | | Venue Name |
| | | Address|[Location] |
| 116 | PD | Type |
| | | URL |
| | | Index?Y/N |
| | | Index Description/Main Image |
| | | Relate to Art|Pub|Exh|Owner |
| | | Read/Write Permissions |

| | | Exhibition Record |
|---|---|---|
| | | ID |
| | | Last Saved/Record Creator |
| | AC | Exhibition Title |
| | PD | Start Date / End Date |
| | PD | Type |
| | AC | [Venue Name incl.Address] |
| | +/AC | [Curator Name] |
| 113 | | URL |
| | | Display Text (Default) |
| | | Index? Y/N |
| | | Index Description/ Main Image |
| | | Relate to Publication |
| | | Relate to Art Work |
| | | Read/Write Permissions |

| | | Exhibition Record (Local Info) |
|---|---|---|
| 133 | | Private Note |
| | | Shared Notes |
| | + | Private Files / Media |

| | | Exhbition Citation |
|---|---|---|
| 136 | | [Display Text] (can overwrite) |
| | | Relate to Art Work |

FIG. 1B

| | | | | |
|---|---|---|---|---|
| ART PRESS Admin: Russell Diamond | | 5 notifications ▽ | | JaneEditor \| Log Out |
| Manage: Artworks \| Artist Info Artist Info & Editor's Notes \| Media Library \| Index pages | | | | 🔍 |

Artworks ⟵1101  1101c  1101d⟶ Add Artwork ⊕

[Publish] [Un-Publish] [Delete] [Chapters▽]  Sort By [New to Old ▽]  1-50 of ###  View [50 ▽]

| ☐ All | Name △ ⟵1101a  1101b⟶ | Edit Log | Edited ▽ | Published △ |
|---|---|---|---|---|
| ☑ 👁 | Artwork Title, Date, #55654564 A (1950-1960) 60% complete | 🕐 | 12/01/10 12:59 pm by JoeAssistant | 08/20/10 2:12 pm by JaneEditor |
| ☐ 👁 | Artwork Title, Date, #55654564 (1950-1960) ⟵1102 | 🕐 | 11/30/10 12:59 pm by JoeAssistant | |
| ☐ 👁 | Artwork Title, Date, #55654564 (1950-1960) | 🕐 | 11/22/10 12:30 pm by JaneEditor 3 NEW EDITS | 11/22/10 12:59 pm by JaneEditor |
| ☐ 👁 | Artwork Title, Date, #55654564 (1950-1960) | 🕐 | 11/21/10 11:15 am by JaneEditor | 11/22/10 12:59 pm by JaneEditor |
| ☐ 👁 | Artwork Title, Date, #55654564 (1950-1960) | 🕐 | 11/21/10 10:09 am by JaneEditor | 11/22/10 12:59 pm by JaneEditor |
| ☐ 👁 | Artwork Title, Date, #55654564 (1950-1960) | 🕐 | 11/22/10 8:11 am by JaneEditor 1 NEW EDITS | 11/22/10 12:59 pm by JaneEditor |
| ☐ 👁 | Artwork Title, Date, #55654564 (1950-1960) | 🕐 | 11/20/10 5:49 am by JaneEditor | 11/22/10 12:59 pm by JaneEditor |
| ☐ 👁 | Artwork Title, Date, #55654564 (1950-1960) | 🕐 | 11/20/10 2:28 am by JaneEditor | 11/22/10 12:59 pm by JaneEditor |
| ☑ 👁 | Artwork Title, Date, #55654564 (1950-1960) 60% complete | 🕐 | 11/15/10 2:16 pm by JaneEditor | |
| ☑ 👁 | Artwork Title, Date, #55654564 (1950-1960) | 🕐 | 11/15/10 2:16 pm by JaneEditor | 11/19/10 10:23 am by JaneEditor |
| ☑ 👁 | Artwork Title, Date, #55654564 (1950-1960) | 🕐 | 11/15/10 2:16 pm by JaneEditor | |
| ☑ 👁 | Artwork Title, Date, #55654564 (1950-1960) | 🕐 | 11/15/10 2:16 pm by JaneEditor | |
| ☑ 👁 | Artwork Title, Date, #55654564 (1950-1960) publish \| unpublish \| delete \| edit chapters | 🕐 | 11/15/10 2:16 pm by JaneEditor | 11/19/10 10:23 am by JaneEditor |
| ☑ 👁 | Artwork Title, Date, #55654564 (1950-1960) | 🕐 | 11/15/10 2:16 pm by JaneEditor | 11/19/10 10:23 am by JaneEditor |

1-50 of ### < Previous 12345678910... Next>

[Publish] [Un-Publish] [Delete] [Chapters▽]                              [Add Artwork ⊕]
  1103     1104      1105                   FIG. 11                        1106

1200

| ART PRESS Admin: Russell Diamond | 5 notifications ▽ | JaneEditor | Log Out |
| Artworks> [Name of Artwork]   Exit Edit & Save | | View History ⏱ | Publish |

| 1. Basic Info | 2. Media | 3. More Info | Last Saved 00/00/00 @ 00:00:00 | Save |

Basic Information

Primary Title | Name of Artwork
Add Alternate Titles | Add Title Remarks

Catalogue Number | Catalogue Number   View Numbering Convention

Creator | Diamond, Russell
Nationality: American | Born in Bitburg, Germany 1972-

Creation Date | From [ ] to [ To ] OR [ Approximation ]
Examples: Spring 1987 or circa 1869
Add Another Creator | Add Revisit Date | Add Creation Place | Add Creation Numbers Copyright | Year Materials and Techniques | Materials and Techniques   X
Add Performance Actions | Add Material and Technique Remarks Materials Color | Comma list of colors Published Materials |
Note: Only this material info will appear upon publishing Classification | Select classification type ▽

Objects/Work | ☐ Books    ☑ Installation    ☐ Prints

| Objects/Work | ☐ Books | ☑ Installation | ☐ Prints |
| --- | --- | --- | --- |
| | ☐ Drawings | ☐ Painting | ☑ Sculpture |
| | ☐ Film | ☐ Performance | ☐ Video & Media |
| | ☐ Electronic Media | ☐ Photography | |

Add Components/Parts Description

Dimension Description

Comma delimited list of dimensions (size, scale, dimensions, etc.)

Add Remarks

Dimension Details

| Dimension Type ▽ | Left Panel | ⊕ |
| --- | --- | --- |
| | Height | Width | Depth | Unit ▽ |
| | Extent ▽ | Quality ▽ | Format ▽ |

Artwork Relationships

| Relationship ▽ | Series Name ▽ | ⊕ |

Description

Description of this edition

Add Edition Remarks

Inscriptions or Marks

Inscription type ▽

Formal statement of copyright / restrictions

Attach Images of Inscription

Inscription Author

Russell Diamond

Inscription Location

Inscription location

Inscription Date

Date OR From 📅 to To 📅

Add Inscription Remarks

Published Inscriptions or Marks

Note: Only this inscription info will appear upon publishing

Artworks> Bus, SR-259678  [Exit Edit & Save]  Last Saved 00/00/00 @ 00:00:00  [Save]

FIG. 12B

View History ⓘ [Publish]

1300

| ART PRESS Admin | Welcome, Tiffany Belle | Log Out |
| John Levi, Sculpture | Artworks | Exhibitions | Publications | Ownership | Artist Info | Media Library |

Artworks      [Add New Artwork]
Ape & Dog (At the Party)
Master | Edition 1 | Edition 2 | Edition 3 | 1 AP | Media Medium / Dims /+     Medium / Dimensions / Inscriptions / Installation

Medium ⊕ ☑

[Enter medium X] [Enamel on wood with incralac steel X]

Medium display:
Enamel on wood with incralac on steel   ☐ Edit citation display

Materials & Techinques ⊕ ☐

[Enter medium X] [enamel X] [wood X] [icralac X]
[acrylic X] [steel X]

Dimensions ⊕ ☐
Dimension Type: [H x W x D ▽]
Dimensions: [70 1/4] x [47] x [48 1/2] [inches ▽]
Dimensions display:
70 1/4x47x48 1/2in. (178.4x119.4x123.2cm)
☐ Edit citation display

Inscriptions    ☐ Artwork is inscribed    ⊕ ☐
Inscription: [ ]

Sidebar:
- Title Date
- Medium / Dims /+
- Published Notes/Related works
- Ownership History
- Exhibition History
- Literature History
- Research Notes Clear page | Delete page
[Preview]
[Submit]
[Save]

FIG. 13B

DIGITAL CATALOGUE RAISONEÉ PLATFORM

CROSS-REFERENCE TO RELATED APPLICATIONS

This application claims priority to U.S. Provisional Patent Application No. 61/495,198, filed on Jun. 9, 2011.

BACKGROUND OF THE INVENTION

Field of the Invention

This invention generally relates to catalogues raisonnés. More specifically, the invention relates to creating, managing, and manipulating digital catalogues raisonnés.

Description of Related Art

A catalogue raisonné is a comprehensive catalogue of an artist's works which has been compiled based on the results of exhaustive research and is often a hallmark publication detailing the artist's career. Those seeking information about the artist's works typically refer to such a catalogue.

Academics, for example, rely on a catalogue raisonné as a key source when researching and writing scholarly works about an artist. Those involved in art sales, such as gallerists, dealers, collectors, and auction houses, also use a catalogue raisonné to define the market for the artist. The wider art community, including museum curators and other art professionals, might use it as well. It is expected that the substance of a catalogue raisonné will inform one about the artist and the artist's work, and be as up to date as possible, at least within the scope of the catalogue raisonné.

An artist's catalogue raisonné may be used to facilitate transactions involving pieces of the artist's work. Particularly, it is used to learn about the work, verify its authenticity, and assess its value relative to both the artist's oeuvre and those of other artists. Without a catalogue raisonné, it can be difficult to obtain such information verified to answer important questions prospective buyers may have regarding a work, such as who was involved in its creation, who its previous owners were, and what museums have shown it. Buyers may shy away from a purchase, or scale back their offers, when their questions go unanswered. Discrepancies, sometimes in the millions of dollars, have been observed between the sale prices of works by artists who have catalogues raisonnés and comparable works by comparable artists who do not.

Traditional catalogues raisonnés generally occupy hundreds of printed pages, contain high-quality reproductions of the works discussed, and include, for each work, detailed text devoted to the work's history, including its full provenance, when and where it was exhibited, and so forth. So even if there is enough interest in an artist to make publishing a catalogue raisonné worthwhile to an editor and a publisher, preparation of the printed catalogue raisonné is expensive and time-consuming. This fact precludes most artists from ever having one of their own. Thus, the art market's existing demand for the relevant information, as evidenced by the high price of print catalogs and the proliferation of art information services, is largely underserved.

Even in instances where a catalogue raisonné is prepared, creators and publishers of the catalogue raisonné typically do not devote additional resources needed to publish the catalogue raisonné digitally or republish updated paper versions. As a result, there exists a fundamental inefficiency in the art market. Traditional, print-based methods for preparing and disseminating catalogues raisonnés result in catalogues that cannot easily be corrected or updated. Thus, a printed catalogue raisonné may not sufficiently satisfy another currently unmet need in the art market—the need for accurate and timely information on artists and their artworks.

Presently-available products permit creation of an electronic database related to an artist's work. Examples include Art Systems, Artbase, ArtTracker, and Masterpiece™ Manager. These products, which are marketed to operators of galleries and museums, include software for managing sales and invoices, consignments, websites, client relations, and advertising. Some of these products simply incorporate basic software for maintaining an artwork inventory. There also are websites that aim to allow artists to create of their own catalogues raisonnés. Such websites are typically designed with an eye towards buying and selling available artwork, rather than preparing and maintaining catalog raisonnés for the purpose of, for example, preserving artists' legacies or cataloguing the physical properties of the artists' works. Collectio.org, a website providing tools for establishing an online inventory of artwork, is one example. Other websites, such as Artnet.com, purport to offer catalogues raisonnés online. What the current products lack is a focus on creating a catalogue raisonné that is accurate and current. Furthermore, although artists should be able to exercise control over much of the information in their catalogues raisonnés, current products do not offer the functionality an individual artist needs, including the abilities to correct, update, and amend existing catalogues. Technical and practical challenges to creating suitable digital catalogues raisonnés include obtaining disparate yet related information, efficiently processing the collected information, and structuring the results in a user interface that the art community finds practical. Accordingly, there exists a need for an improved digital system for creating, maintaining, and accessing a digital catalogue raisonné.

BRIEF SUMMARY OF THE INVENTION

The present invention addresses the challenges in the art discussed above.

According to one aspect of the invention, a method for creating a digital catalogue raisonné includes receiving, at a private user interface of a content management system, first digital data for at least one artist, the content management system having at least one computer, and the first digital data including at least one of an image of an artwork of the at least one artist and a description of the artwork. The method also includes storing the first digital data in at least one document-oriented database of the content management system and transmitting, through the private user interface, information permitting a user to provide a command to the content management system to make available, at a public interface of the content management system, a public catalogue raisonné including the first digital data. The method further includes receiving, at the private user interface, the command to make available the public catalogue raisonné. The public user interface is an interface other than the private user interface.

According to another aspect of the invention, a content management system for creating a digital catalogue raisonné includes at least one computer, a public user interface, a private catalogue raisonné manager, and a private user interface. The private catalogue raisonné manager is configured to instruct at least one document-oriented database to store first digital data for at least one artist, the first digital data including at least one of an image of an artwork of the at least one artist and a description of the artwork. The private user interface is configured to receive the first digital data, transmit information permitting a user to provide a command to the content management system to make available, at the public user interface, a public catalogue raisonné including the first digital data, and receive the command to make available the public catalogue raisonné.

According to yet another aspect of the invention, a non-transitory computer-readable medium stores instructions which, when executed by a processor, cause the processor to receive, at a private user interface, first digital data for at least one artist, the first digital data including at least one of an image of an artwork of the at least one artist and a description of the artwork. The instructions, when executed by the processor, also cause the processor to: store the first digital data in at least one document-oriented database; transmit, through the private user interface, information permitting a user to provide a command to make available, at a public interface, a public catalogue raisonné including the first digital data; receive, at the private user interface, the command to make available the public catalogue raisonné. The public user interface is an interface other than the private user interface.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the drawings. Like reference numbers between two or more drawings can denote identical or functionally similar elements unless the description indicates otherwise.

FIGS. 1A through 1C show examples of database records that can be included with a content management system.

FIG. 11 shows an example view of information from an administrative user interface being displayed.

FIGS. 12A and 12B show another example view of information from an administrative user interface being displayed.

FIGS. 13A and 13B show yet another example view of information from an administrative user interface being displayed.

DETAILED DESCRIPTION OF THE INVENTION

A Digital Catalogue Raisonné Platform

Figure 1A:
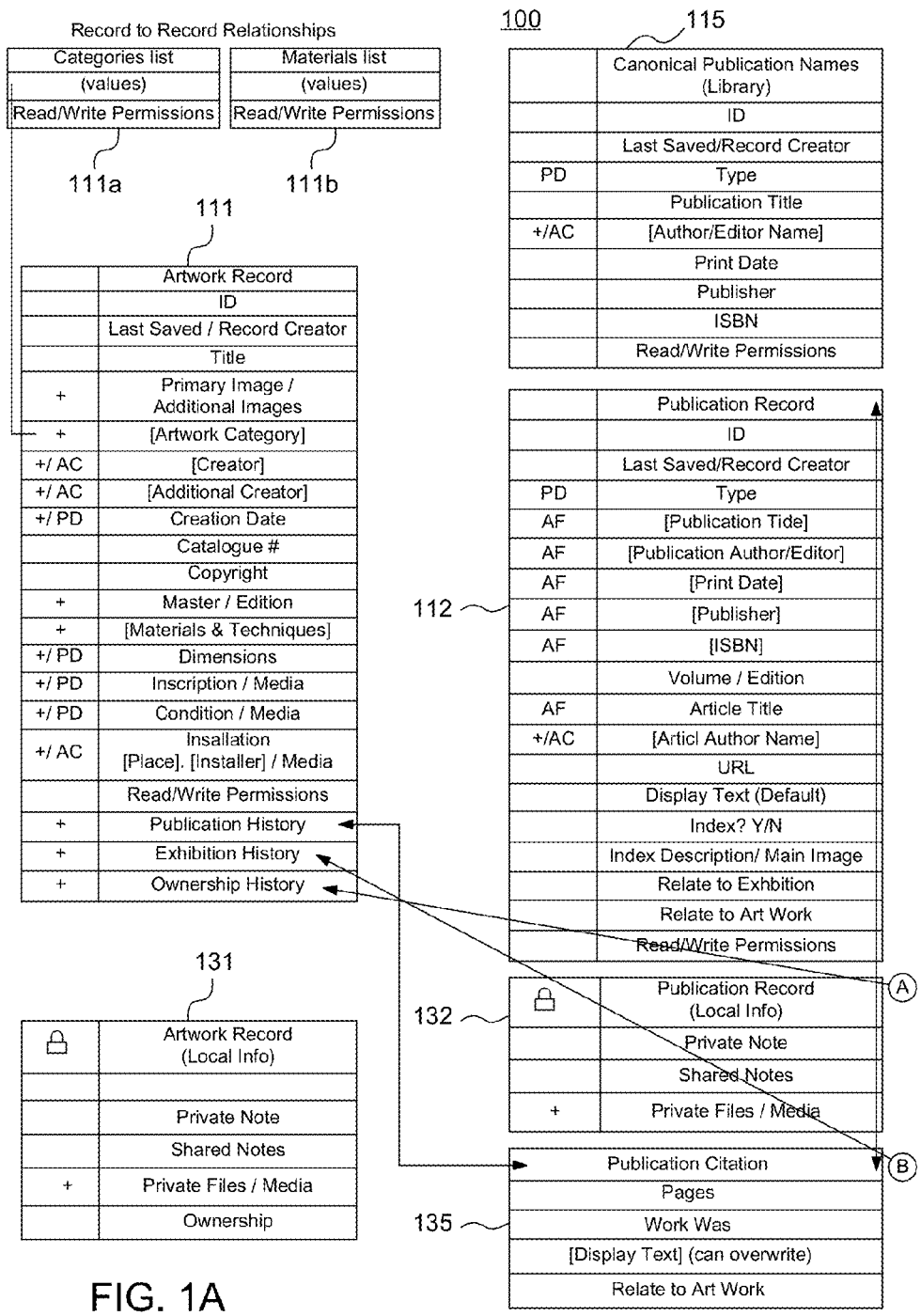

Example embodiments are directed to a digital catalogue raisonné platform ("digital CR platform"). The digital CR platform is a publishing platform that can provide up-to-date cataloguing and the creation of dynamic archives for artists' works. Each digital catalogue raisonné ("digital CR") on the digital CR platform contains a list of artworks from an artist's body of work. A digital CR can be published by the digital CR platform, resulting in a digitally-published catalogue raisonné ("public CR") that is accessible to the users of the digital CR platform. A public CR may provide all information stored in the digital CR, or a more limited subset of such information. Users with access to the digital CR (e.g., an individual artist or a third party, such as an editor) can control which information in the digital CR is published in the public CR.

The digital CR platform also can use the digital CRs and their associated content, or make such information available to third parties, to provide products and services to artists, scholars, researchers, art professionals, the wider art community, and the general public. For example, transactions involving copyright requests or licensing rights to artwork images in the digital CRs can be facilitated by using the digital CR platform. The digital CR platform, through on-site and/or cloud storage, can serve as a digital repository for artists' intellectual property, and thereby preserve their copyrights. An artist, others associated with the artist (such as a studio, the artist's estate, or a gallery representing the artist), and/or independent editors can use the digital CR platform to create and edit digital CRs. By enabling artists to be involved in the creation and maintenance of their own digital CRs, the digital CR platform assists artists in defining their oeuvre and legacy, and also allows artists to provide information regarding the preservation of their artworks.

The digital CR platform can be accessed by users through one or more user interfaces (UIs). These UIs can include, for example, an artist UI, an admin UI, an editor UI, a collector UI, a museum UI, and a gallery UI.

To create a digital CR on the digital CR platform, generally, digital content such as text, images, videos, and other data is sourced directly from users such as artists, collectors, museums, galleries, publishers, and even the general public. For example, an artist can create digital content based on their artwork (e.g., a digital image of artwork, a text description of artwork, text describing the exhibition history of artwork, audio describing an artwork's style) and, as a user of the digital CR platform, upload the digital content. Uploaded digital content can later be supplemented by the original source or another source. For example, a collector who owns artwork that is the subject of digital CR can create digital content based on owned artwork and, as a user, upload the content to supplement the digital CR.

The digital CR platform can incorporate limitations or controls (such as individual user logins) on access to the various UIs available on the platform and/or access to the tools, functionality, or components of the platform. The security features can allow certain users of the digital CR platform (e.g., administrators) to control: a user's ability to store information in a digital CR; a user's ability to select information in a digital CR for publication; and a user's ability to actually publish information in a public CR. In an example embodiment, information uploaded to the digital CR platform is manually verified (by, for example, an editor) prior to publication, and only verified information may be published. Thus, different interfaces (or different parts of a single interface) of the digital CR platform can be provided to multiple users who perform different functions (e.g., a user who is uploading information, a user who is verifying information, and a user who is publishing information).

While in some instances, an artist (or the artist's studio or estate) creates and/or uploads the digital content to create a digital CR, in other cases, an artist need not be directly involved in creating a digital CR. In these cases, others such as researchers, gallerists, collectors, and publishers can submit digital content to create or modify a digital CR. For example, the operator of the digital CR platform can authorize a third party to create and upload digital content needed to create a digital CR, or a user of the digital CR (e.g., a researcher, gallerist, or collector) can authorize the third party.

A content management system of the digital CR platform receives the digital content from users. Web-based interfaces to the content management system allow certain users to approve the content. Users able to approve content can include, for example, the artist who is the subject of the content, or an authorized editor, i.e., a person authorized by the artist, by the creator of the content, or by the operator of the digital CR platform to approve content. Approved content can then be used to create a digital CR, or modify an existing one, and publish it as a public CR. Requiring approval for content of a digital CR allows for verification of submitted information, which can improve the accuracy of a public CR published from the digital CR.

The content management system also allows uploaded digital content to be verified for accuracy and/or authenticity through research by users such as the operator of the digital CR platform (and/or users under the direction or control of the operator), authorized editors, artists, and/or independent third parties authorized by the operator to examine content. As discussed above, in example configurations of the digital CR platform, a user's ability to upload information and/or select that information for publication is separate from a user's ability to publish information. Digital CRs on the digital CR platform can thus provide information that is not only up-to-date, but also accurate.

The content management system also provides information on the content to the users of the digital CR platform. This can reduce instances of duplicate work by the various content creators, and improve the creation and maintenance of the digital CRs.

In publishing a digital CR as a public CR, publishing features of the digital CR platform allow artists and editors to have control over how users can view the public CRs, from the design of specific pages of the public CR to the overall look, feel, and content of the public CR. The content management system further provides users with web-based access to public CRs, which include customizable artwork display pages that are published based on the digital CRs.

The web pages through which users access the public CRs also can be customized, along with how users navigate between web pages. Features that the digital CR platform provides to users accessing public CRs include: searching and browsing of public CRs, assisted by views of artworks in the public CRs by series, exhibition, venue, publication, collector, and so forth; image display features such as full-screen display, zooming, and lightbox views; individual pages for all artworks, with the ability to track information on an object-by-object basis; and display modes for viewing public CRs on portable devices such as tablet computers and smartphones.

Additional features of the digital CR platform include functionality to allow users to save their research, create collections, personalize their own views of the catalogues, and submit additional information to editors.

The digital CR platform provides several benefits to artists, their studios, their estates, and the galleries that represent them. Artists can create their own digital CRs, thus allowing those artists who may not previously have had a catalogue raisonné to now have one. Artists also can edit their digital CRs to control how their artworks are defined, presented, and preserved. Artists can also submit other relevant information (e.g., video interviews, writings, essays, reviews), store information relevant to their artwork, such as information on the meaning or preservation of individual artworks, and associate that information with their digital CR. Lastly, artists can select portions of their digital CR to be included in their public CR, and publish that information, for example, with the aid of the operator of the digital CR platform, an authorized editor, or some other party.

The digital CR platform benefits collectors by allowing them to provide their own insights into artists' oeuvres by submitting information and editing digital CRs. Collectors also can use the public CRs to research works they are considering purchasing.

The digital CR platform also benefits the wider art community. Galleries and dealers can use artists' digital CRs as sales tools to deliver information about artists and their works to clients and potential artwork purchasers. Auction houses can use digital CRs as an independent and/or additional source for verifying the provenance of works up for sale. Museums can use digital CRs to help locate works and to facilitate exhibition planning Scholars can submit new information to the CRs as they perform new research, and use public CRs as sources for their research.

The Content Management System

As described above, the digital CR platform includes a content management system, which is a hardware-based system that provides user-accessible functionality to the digital CR platform. The content management system can include software components such as: a virtualized hosting environment for providing cloud computing services; web server software; a web application framework for developing web sites, web applications, and web services; a database management system for creating and providing access to databases; an enterprise search platform; a Java servlet container; and online storage web services.

The content management system includes document-oriented databases containing the data underlying the digital CRs and public CRs of the digital CR platform. The databases of the content management system include various database records. Consequently, a digital CR is one or more database records, including data linking records to other records and to data objects such as images, other media data, and metadata.

A public CR, which is a published version of part or all of the digital CR, can be defined two ways. At a high level, it is the presentation of data contained in the database records making up the digital CR. It is this definition that should come to mind when a user is described, for example, as "viewing a public CR" or completing a similar act. On the other hand, at a low level, a public CR, like a digital CR, is one or more database records, including data linking records to other records and to data objects such as images, other media data, and metadata. However, the extent of the data contained in a public CR may not be the same as the data contained in its corresponding digital CR because, for example, users may have placed restrictions on data in the digital CR preventing that data from being published and viewed in the public CR.

For each digital CR, some database records may be global, i.e., data in those records can be made available to other digital CRs. This allows for the creation of data that can be shared among multiple digital CRs. Other database records are local, i.e., data in those database records is not available to other digital CRs.

Figure 1C:
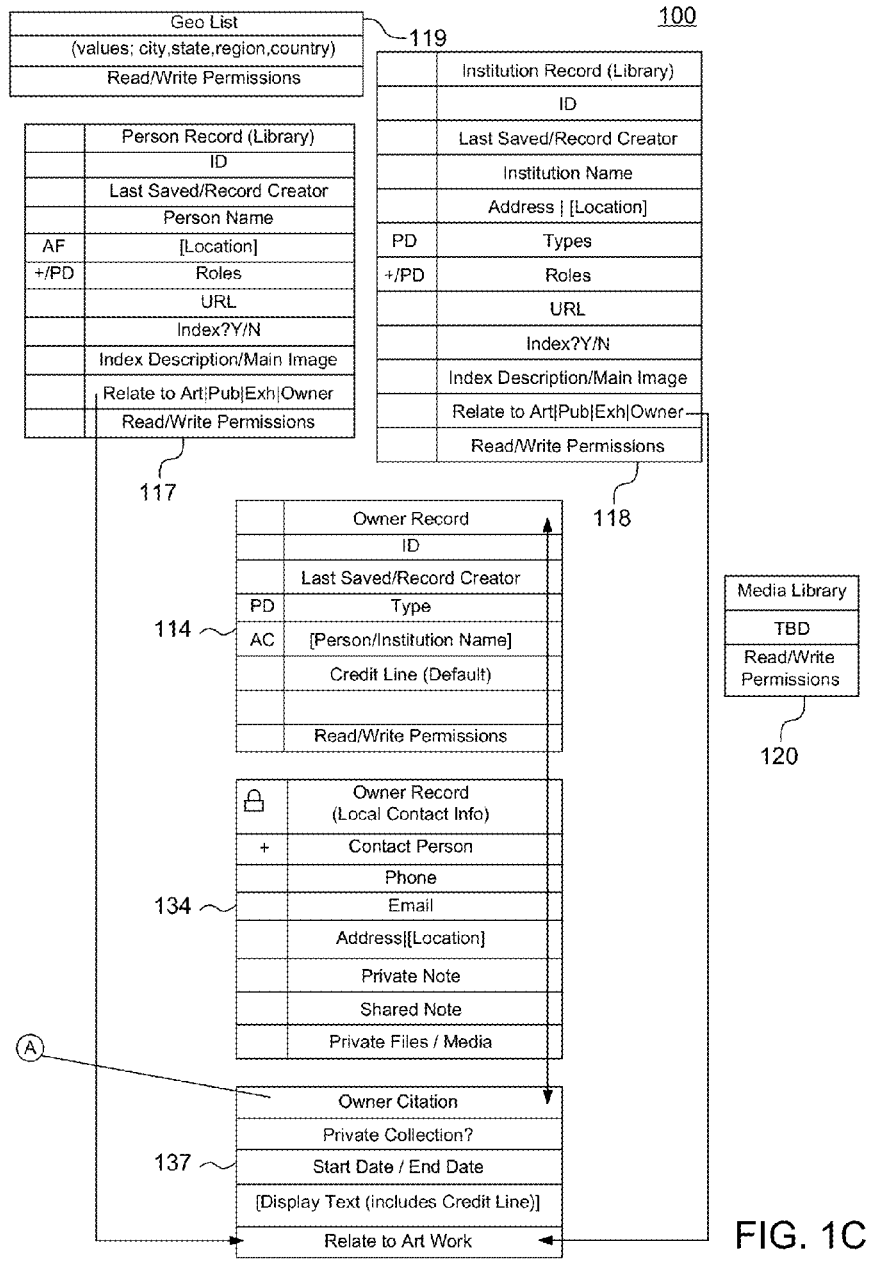

FIGS. 1A through 1C illustrate example components of a document-oriented database 100, according to an example embodiment. Database 100 includes global database records and local database records. Global database records in database 100 include artwork record 111, publication record 112, exhibition record 113, and owner record 114. Local database records in database 100 include artwork record 131, publication record 132, exhibition record 133, and owner record 134. Certain marks illustrated in the records of FIGS. 1A through 1C indicate how data can be entered into record fields. For example, "PD" indicates that a pull-down menu can be used to populate a field, and "AC" indicates that a field can be auto-completed. These marks (and their associated functions), however, are shown simply as examples.

Data fields in global artwork record 111 store data on artwork, including: the artwork's title, image(s) of the artwork; creator(s) of the work; the creation date of the work; the work's materials; the work's catalogue number in a digital CR; information on copyrights held on the work; the dimensions of the work; and media information on the work, including its inscriptions, its condition, and installation specifications.

Artwork record 111 also includes fields for storing data on the category of the work, and data on the materials and techniques used in making the work. In the example of database 100, these two fields are related to other global data. In particular, the "artwork category" field in artwork record 111 is linked to categories list 111*a*, which contains a list of categories of artwork (e.g., painting, sculpture, and prints), and the "materials and techniques" field in record 111 is linked to a materials list 111*b*, which contains a list of materials used to create artwork (e.g., acrylic, paint, canvas, wood, and steel).

Artwork record 111 further includes fields for storing data on the record itself, including: data identifying the record; the creator of the record; the history of the record (e.g., its "last saved" time); and the read and write permissions of the record. History data recorded in artwork record 111 can include data on the publication history, exhibition history, and ownership history of the artwork. These data can be obtained from or linked to data in other records or tables, such as publication record 112, exhibition record 113, and owner record 114; these various links can then presented on the public CR as publication citation 135, exhibition citation 136, and owner citation 137, respectively, which are described below.

Data fields in global publication record 112 store data on a publication, including: the title; author(s) and/or editor(s); print date; publisher; and ISBN. In the example of FIGS. 1A through 1C, these fields are related to other global data, specifically, canonical publication names 115, a library that is a repository in the database for publication information in publication records.

Publication record 112 also includes fields for storing other data on a publication, including the type of publication, the volume and edition, an article title, an article author, a URL where information on the publication is available, display text, and other identifying information.

Publication record 112 further includes fields for storing data on the record itself, including: data identifying the record 112; the creator of the record; the history of the record; index information and read and write permissions for the record. Index information can refer to whether the record is indexed, i.e., whether a page for the record has been created in a digital CR. In an example embodiment, some records (e.g., artwork records) are indexed automatically, while other records may require a user to index the record manually. Thus, for a record requiring manual indexing, index information can indicate whether that record has been indexed.

Data fields in global exhibition record 113 store data on an exhibition of artwork, including: the exhibition's title; the dates of the exhibition; the type of exhibition; the exhibition venue's name and address; the name and address of any additional affiliated venues; and the exhibition's curator. In the example of database 100, the field for the exhibition venue is related to other global data. Specifically, the field is related to venue record 116, a library that is a repository in the database for venue information in exhibition records.

Exhibition record 113 also includes fields for storing other data on an exhibition, a URL where information on the exhibition is available, and display text and other information identifying the exhibition. Exhibition record 113 further includes fields for storing data on the record itself, including data identifying the record, the creator of the record; the history of the record, and the read and write permissions of the record.

Data fields in global owner record 114 store data on an owner of an artwork, including: the type of artwork owned; the name of the owner; and the owner's preferred published credit line for the artwork. Data stored in owner record 114 need not be published in a public CR, however. For example, an owner may specify (using an Owner UI, for example) that his or her name be kept private (in which case, a public CR may display a designation such as "private collector"), or that his or her financial information be kept private. Where an owner owns more than one artwork, the owner's specifications regarding data in owner records may vary among the artworks. Owner record 114 also includes fields for storing data on the record itself, including data identifying the record the creator of the record, the history of the record, and the read and write permissions of the record.

Database 100 includes libraries. Libraries generally are collections of similar data stored among various database records. For example, as described above, canonical publication names 115 is a collection of publication information, such as title and author, from data stored in multiple publication records, and venue record 116 is collection of exhibition venue names from data stored in multiple exhibition records. Other libraries in database 100 are person record 117 and institution record 118. Person record 117 is a collection of information on individuals, including name, location, role (e.g., title or employment), and URL (e.g., personal website). Similarly, institution record 118 is a collection of information on institutions, including name, location, institution type (e.g., academic, government, non-profit), role, and URL.

Libraries store information as data fields, and libraries themselves are database records. Because the database 100 is a document-oriented database, data fields in libraries do not need to be populated, but instead can be links to fields in other database records, such as artwork records, publication records, exhibition records, and owner records, and populated and updated automatically. For example, as shown in database 100, the "venue name" field in venue record 116 may be linked to a "venue name" fields in exhibition record 113. In this example, when information is added to the "venue name" field in exhibition record 113, or when the field is edited, the addition or edit is reflected automatically in the "venue name" field in venue record 116.

Database 100 also includes lists. Lists are sets of similar information. However, lists do not collect information stored among various database records. Rather, lists provide a set (or sets) of information restricting what information can be populated into data fields of database records and libraries. For example, categories list 111a is a set of categories of artwork, one or more of which must be selected in order to populate the "artwork category" field of artwork record 111. The "artwork category" field of the record can be populated only with artwork categories in categories list 111a, and cannot be populated with any category not listed.

In addition to categories list 111a and materials list 111b, database 100 also includes geo list 119, which is a set of geographic information (e.g., cities, states, regions, and countries).

Local database records in database 100 include local artwork record 131, local publication record 132, local exhibition record 133, and local owner record 134. Each of these local records corresponds to one of the similarly-named global records discussed above. In particular, each local record contains data specific to an individual digital CR (i.e., the data is used only within an individual digital CR), such as private notes and private media. For example, local artwork record 131 may contain notes for an artwork that is the subject of global artwork record 111. However, because those notes are to be available only in an individual digital CR (and not in any other digital CR containing the artwork), the notes are stored in local artwork record 131 rather than in a global record such as artwork record 111.

Database 100 further includes local publication citation 135, local exhibition citation 136, and local owner citation 137. A local citation is linked to a global record, and is a format of that global record provided to a specific digital CR. A citation thus is a repository of data from a global record that has been formatted for a specific digital CR. For example, a person named John Smith may be the owner two artworks, and the database may contain a global "John Smith" owner record. For the local owner citation of a digital CR containing the first artwork, the citation may identify the owner as "John Smith," just as in the global owner record. However, for the local owner citation of a digital CR containing the second artwork, the citation may identify the owner as "Private Collector." Thus, although both artworks are linked to a single global owner record, the different formats provided by the local owner records cause the digital CRs to have access to different data. It is not necessary that each global record in database 100 have a corresponding local citation, however.

The content management system supports various user applications. Some applications allow users of the digital CR platform to manage (e.g., create, edit, and/or publish) digital CRs. In an example embodiment of the invention, users manage digital CRs using a private catalogue raisonné manager ("private CR manager") application that includes an administrative user interface ("admin UI"). The private CR manager application can be a web-based application, i.e., users can access the private CR manager using a web browser.

In an example embodiment of the invention, some functionalities of the admin UI of the private CR manager can be used to create and publish a digital CR, while other functionalities of the admin UI can be used to create a digital CR and its content (e.g., uploading, formatting, and deleting content), and to select content of the digital CR for publication. Thus, in this example embodiment, by controlling user access to the various functionalities of the admin UI, the ability to publish information from a digital CR can be separated from the ability to archive and collect information. For example, one user can be provided access to the functionalities of the admin UI allowing the user to upload, edit, and select information for publication, but not publish that information (e.g., the user can be designated an editor of a digital CR), while another user can be provided access to the functionalities of the admin UI allowing the user to publish information selected for publication, but not edit that information (e.g., the user can be designated as a publisher of a digital CR).

Other applications of the content management system allow users to access view public CRs. In an example embodiment of the invention, users can access and view public CRs through a public user interface ("public UI") delivered through web pages hosted on a web server of the content management system.

Figure 2:
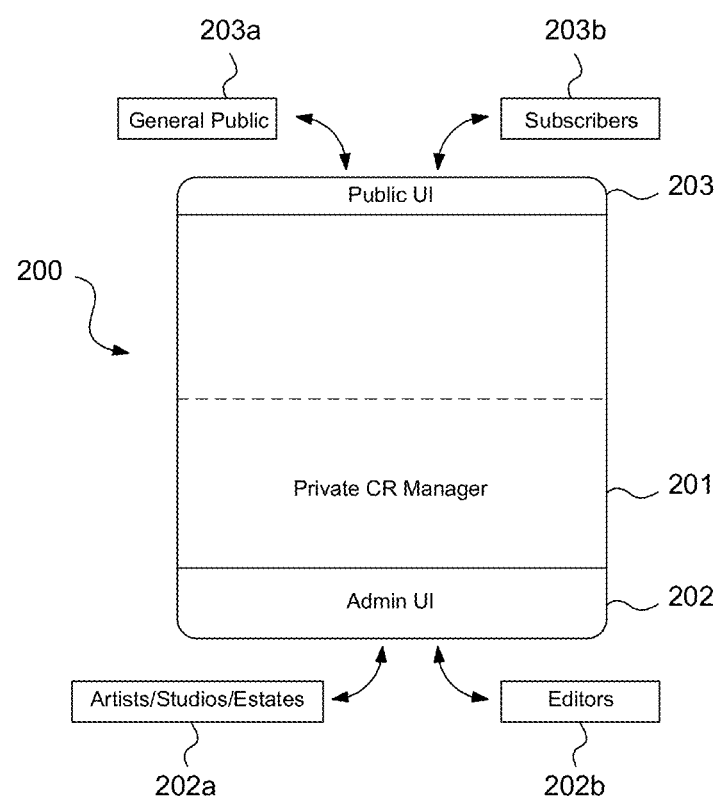
FIG. 2 is a diagram of a content management system, according to an example embodiment of the invention.

FIG. 2 is a diagram of a content management system 200, according to an example embodiment of the invention. Content management system 200 includes two interfaces: an admin UI 202 and a public UI 203. Admin UI 202 is linked to a private CR manager 201. Certain users (such as artist/studios/estates 202a and authorized editors 202b, discussed below) access the content management system 202, specifically private CR manager 201, through admin UI 202. In contrast, other users (such as the general public 203a and subscribers 203b, also discussed below) access the content management system 200 through public UI 203.

Admin UI 202 can provide separate functionality for editing, uploading, selecting information for publication, and publishing information. In an example embodiment, the functionalities of admin UI 202 which permit a user to create and edit digital CRs are provided to at least the artist(s) who is a subject of the digital CR and the editor(s) of the digital CR.

Public and Private Users of the Digital CR Platform

In an example embodiment of the invention, the content management system of the digital CR platform includes, on one hand, a web-based private CR manager application, including the admin UI, for managing digital CRs, and on the other, a web-based public UI for accessing and viewing public CRs.

Users of the content management system can be divided into two main groups: public users and private users. In turn, there are two types of public users, subscribers and non-subscribers, and various types of private users, as discussed below. In an example embodiment, however, there are two general types of private users: those who are able upload and edit data for a digital CR (and submit that data for publication); and those are able to publish data of a digital CR into a public CR.

Public users of the digital CR platform can use the public UI. However, subscribers of the digital CR platform have obtained a subscription provided by the digital CR platform that offers wider access to public CRs through the public UI than that available to non-subscribers.

To demonstrate the distinction between subscribers and non-subscribers, a subscription to the digital CR platform may be required in order to access public CRs, view certain content of public CRs, or perform other functions associated with public CRs (e.g., search, save, use external services, data saving and collecting, etc.). A subscription to the digital CR platform does not necessarily permit the subscriber to use the admin UI of the private CR manager. In fact, in an example embodiment of the invention, public users, whether subscribers or not, cannot use the admin UI. Moreover, the availability of subscriptions notwithstanding, all public users may be required to register with the digital CR platform in order to access public CRs through the public UI.

Subscriptions needed to access content of the public CRs can be paid subscriptions, which provide revenue to the operator of the digital CR platform. Paid subscriptions can have various prices. For example, a subscriber may choose from a lower-cost subscription that provides access to a single public CR, a higher-cost subscription that allows access to all public CRs, or an intermediate subscription that allows access to some, but not all, public CRs. In general, the terms of a subscription may vary based on its length and/or the amount of access it permits. A subscription can be a one-time fee or may require regular renewal (e.g., annual or monthly). Furthermore, the price of any subscription may vary depending on whether the subscriber is an individual or an institution.

Private users of the digital CR platform, on the other hand, can access the admin UI of the private CR manager to manage digital CRs. Private users can include artists, studios, editors, collectors, gallerists, and other art professionals. Private users can also include the operator of the digital CR platform and authorized editors. Access to one digital CR does not necessarily include access to all digital CRs. Similarly, access to the functionality of the admin UI to publish a digital CR does not necessarily include access to edit the digital CR or its content.

Different private users can have different levels of access through the admin UI. For example, an artist's access to the private CR manager through the admin UI can be limited to managing his or her own digital CR. Likewise, a gallerist's access can be limited to managing the digital CRs of artists whom the gallerist represents. Authorized editors can have higher levels of access to the private CR manager, since the scope of the work on the digital CR platform may include creating and/or editing CRs for many different artists. The operator of the digital CR platform (and/or users under the direction or control of the operator) may have the highest level of access to the private CR manager. Furthermore, each private user can have access to a repository of private notes which can only be accessed by that user.

A private user may need to register with the digital CR platform in order to gain access to the private CR manager. Registration may include providing secure credentials or a digital certificate. In turn, then, the operator of the digital CR platform may create an account for a user who has registered.

The Public UI

The public UI is a user interface made available to public users and subscribers to access and view public CRs, which are published versions of the digital CRs of a digital CR platform. Generally, the public UI displays public CRs to users and allows the users to interact with the public CRs, but does not permit access to the digital CRs.

The public UI allows a user to view a public CR in various ways. For example, the user can select a list view (with image thumbnails of artworks and basic information) and further choose to have the artworks sorted or filtered by data associated with the artworks.

The public UI also allows a user to view artwork pages that pertain to an individual artwork within a public CR. Thus, for each artwork in a public CR, there should be an artwork page. The artwork page displays the artwork (and/or associated media data and other data). Media data displayed on the artwork page can include an image of the artwork and media relating to the artwork (e.g., sketches, videos, or podcasts about the work). Other data displayed on the artwork page can include information about the artwork (including its title, date, medium, and dimensions), as well as the work's exhibition history, its publication history, its provenance, a description of the work, a statement by the artist about the work, installation instructions for the work, and user tags.

The public UI also allows a user to view an artist information section, which can consist of multiple pages. For the artist of a public CR (or each artist of a digital CR that includes multiple artists), the artist information section displays information about the artist including, for example, exhibition history, literature history, biographical information, photos, personal statements, critical essays, representation information (e.g., a gallery that represents the artist), contact information, bibliography, internet links (e.g., URLs to web pages related to the artist), press packages, and associated media (e.g., sketches, videos, or podcasts by the artist).

The public UI has several tools integrated into the user interface. These tools include an image viewer, video player, search functions, browse functions, save functions, social functions, user access functions, functions for submitting copyright and image licensing requests, functions for submitting information to an editor of the corresponding digital CR for consideration of inclusion in the public CR, and payment functions. The tools may be included with or embedded in an artwork page or artist page, and/or separately accessible in the public UI.

The image viewer permits a user to view images associated with a public CR, including artwork images, slideshows, and galleries. The image viewer can permit different views, such as a lightbox view, zoom in/out, and alternate or supplemental views (e.g., different views of a three-dimensional work). Likewise, the video player permits a user to view videos associated with a public CR.

The search functions permit a user to search across one or more public CRs. For example, the search function can prompt a user to enter text. Submitted text is then searched across all text data associated with artworks in the CRs being searched. A search may encompass all available public CRs. On the other hand, the user can specify particular public CRs to be searched. For example, a user may wish to search a public CR of an individual artist for a certain work, for works exhibited at a certain place, or for works created at a certain time. The search functions also can allow a user to provide information to sort (or limit) artworks being browsed. Information that can be used to sort (or limit) artworks includes artist name, artwork date, artwork title, artwork medium, series (among various artworks), place, current location, "chapter" (themes determined by, for example, an editor, artist, or digital CR operator, which represent groupings of artworks for understanding a public CR), and/or time of exhibition, publication, and/or issue.

The browse functions permit a user to browse public CRs. A user typically may browse one CR at a time. The browse functions can also allow a user to use data to sort (or limit) artworks being browsed. Data that can be used to sort (or limit) artworks includes artist name, artwork date, artwork title, artwork medium, series (among various artworks), place, current location, chapter, and/or time of exhibition, publication, and/or issue.

The save functions allow a user to save (at the digital CR platform, locally with the user, and/or remotely) information about artworks and other information from public CRs. Users also can organize saved information. These functions may be used, for example, for research purposes.

The social functions allow a user to share their own information with other users. For example, a user can "like" an individual artwork or artist page. The user also may be permitted to create and update a profile. The social functions can provide messaging and communication features such as chats and direct messages.

The user access functions control the user's access to portions of the public UI. It is by these functions that the different levels of access provided to public users or subscribers can be controlled. Also by these functions, access to public CRs (and/or certain content of public CRs) can be provided or restricted. The user access functions can also include user authentication, which requires the user to login by providing a username, password, and/or other security credentials, before the user can access other features or functions of the public UI.

The functions for submitting copyright and image licensing requests allow users to create, from within a public CR, a request for permission to use a copyright and/or image, and to submit that request to an artist, owner, or other party.

The payment functions allow users to pay for services provided by (or through) the digital CR platform. For example, the payment functions can allow a public user to become a subscriber or pay for external services.

Example Views of Information Displayed Through a Public UI

FIGS. 3 through 9 show example views of information being displayed through a public UI. The views in these figures show information in the form it is presented to a user by, for example, a web browser or other application that can display information transmitted over a network.

Figure 3:
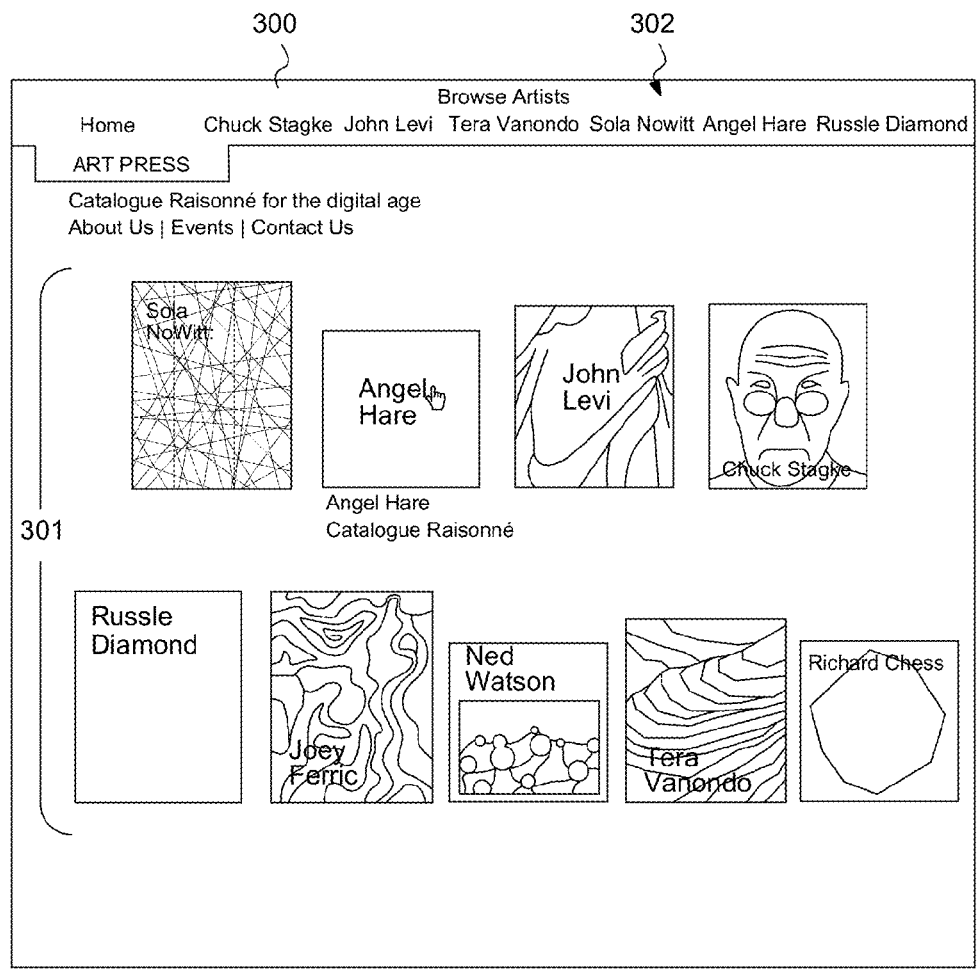
FIG. 3 shows an example view of a user home page.

FIG. 3 shows a view of a user home page 300. User home page 300 shows several images 301 that correspond to (and are links to) public CRs accessible to the user. User home page 300 includes a title bar 302 which allows a user to choose to browse accessible CRs by subject artists.

Figure 4:
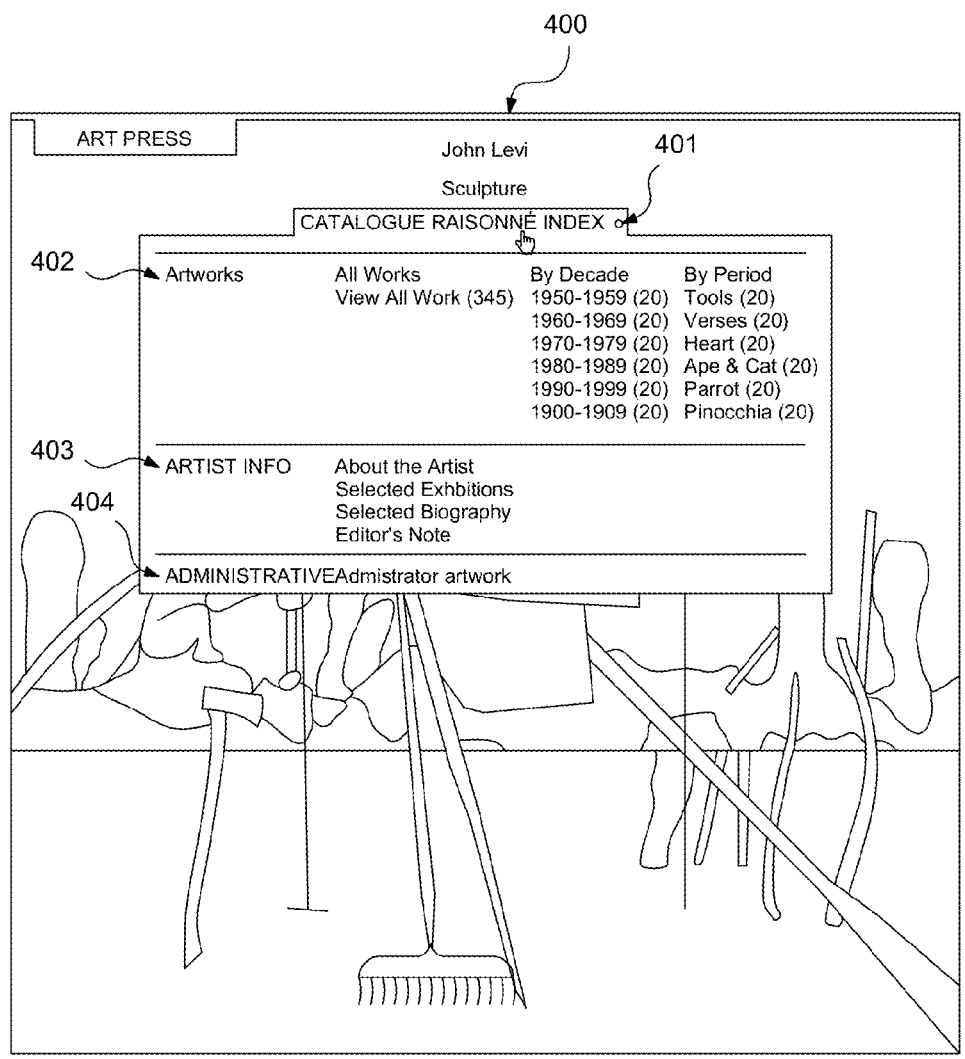
FIG. 4 shows an example view of a public CR home page.

FIG. 4 shows a view of a public CR home page 400. Public CR home page 400 includes a public CR index 401. The complete index 401 ordinarily may be minimized on home page 400, only becoming active when, for example, a user directs a cursor to the minimized index. Index 401 includes an artwork menu 402, an artist information menu 403, and an administrative menu 404.

Artwork menu 402 allows a user to choose a manner in which to browse artworks in the public CR. The user may choose, for example, to browse all works in the public CR, to browse all works within a particular time period, such as a decade, or to browse all works belonging to a particular period of the artist's life. Artist information menu 403 allows the user the view particular kinds of information about the artist, such as biographical information, information about exhibitions of the artist's works, and information created by the editor of the public CR. Administrative menu 404 allows the user to access administrative features of the digital CR, and may be "grayed-out" or otherwise inaccessible to a user, depending on the level of the user's access to the public CR.

Figure 5:
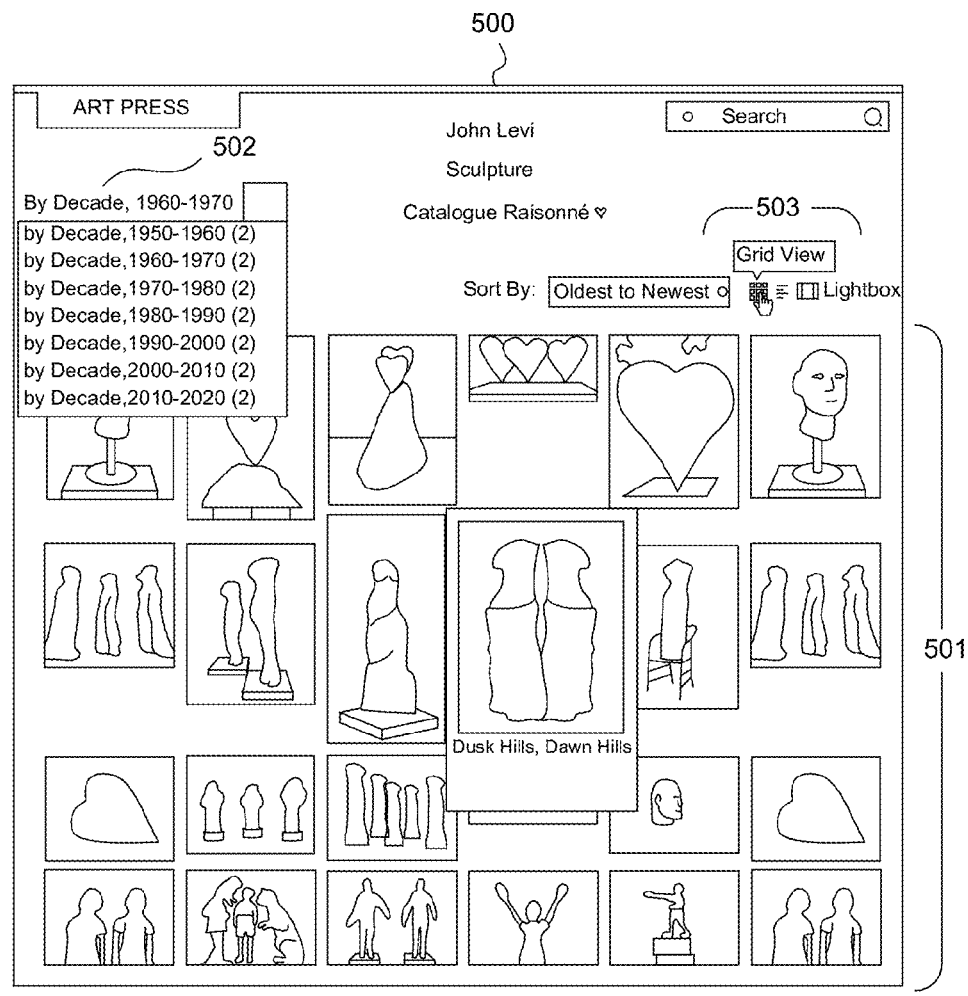
FIG. 5 shows an example view of browse page for a public digital catalogue raisonnés.

FIG. 5 shows a view of browse page 500 for a public CR. Browse page 500 includes images 501 of artworks within the public CR. Each image 501 can include a link to a page (or pages) of its corresponding artwork. Browse page 500 also includes browse menu 502 and view menu 503. Browse menu 502 allows a user to select an option for browsing different artworks in the public CR (e.g., by selecting a different decade), while view menu 503 allows the user to select an option (e.g., grid view, list view, or lightbox view) for viewing the currently-displayed artworks.

Figure 6:
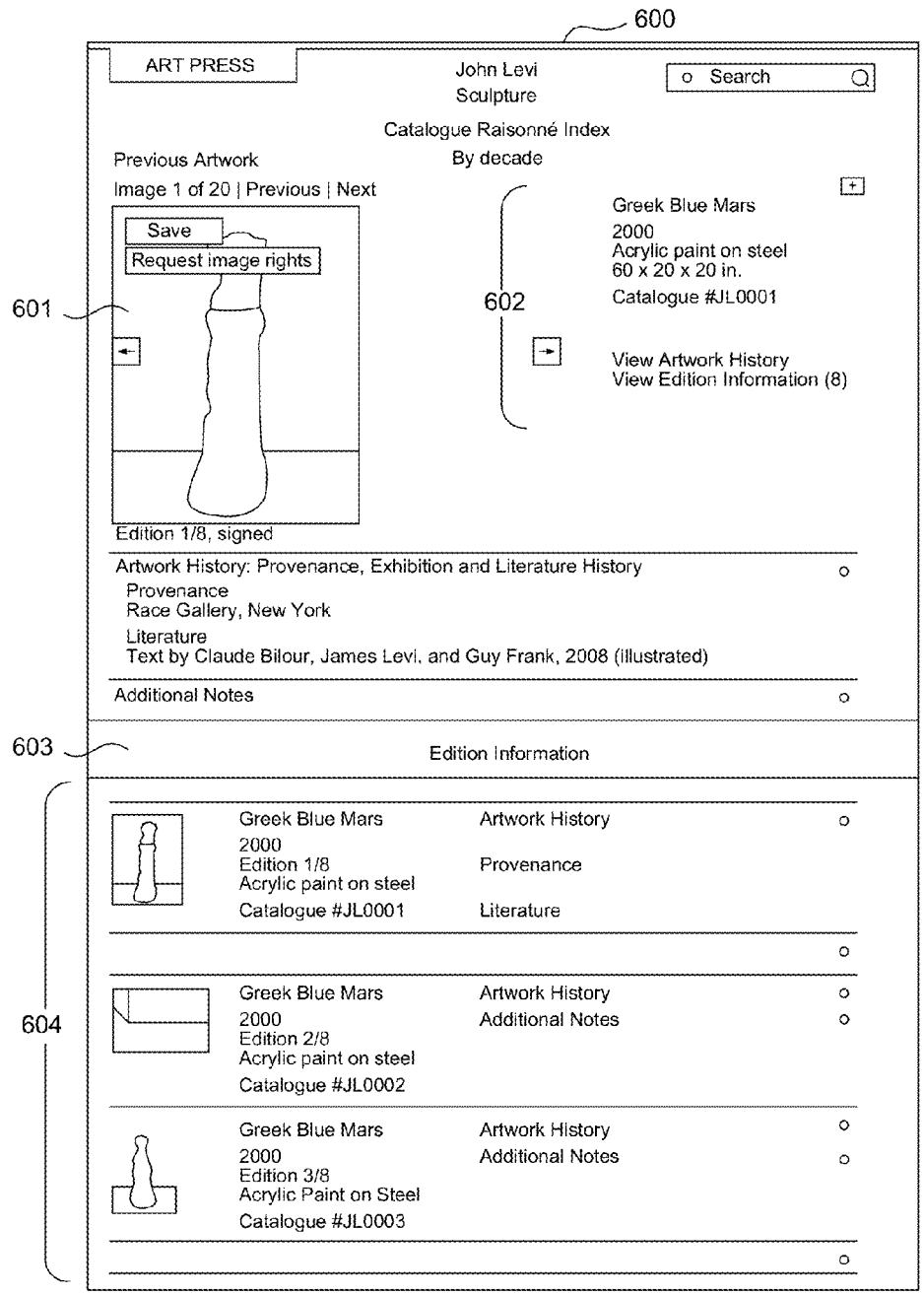
FIG. 6 shows an example view of an artwork page for an artwork within a public digital catalogue raisonnés.

FIG. 6 shows a view of an artwork page 600 for an artwork within a public CR. Artwork page 600 displays data including an image 601 and a description 602 of the artwork. Also displayed in an edition pane 603 are other editions 604 of the artwork. The editions may be different views or images of the artwork, and may include prints and other renderings of the artwork. Each edition 604 can include an image and a description.

Figure 7:
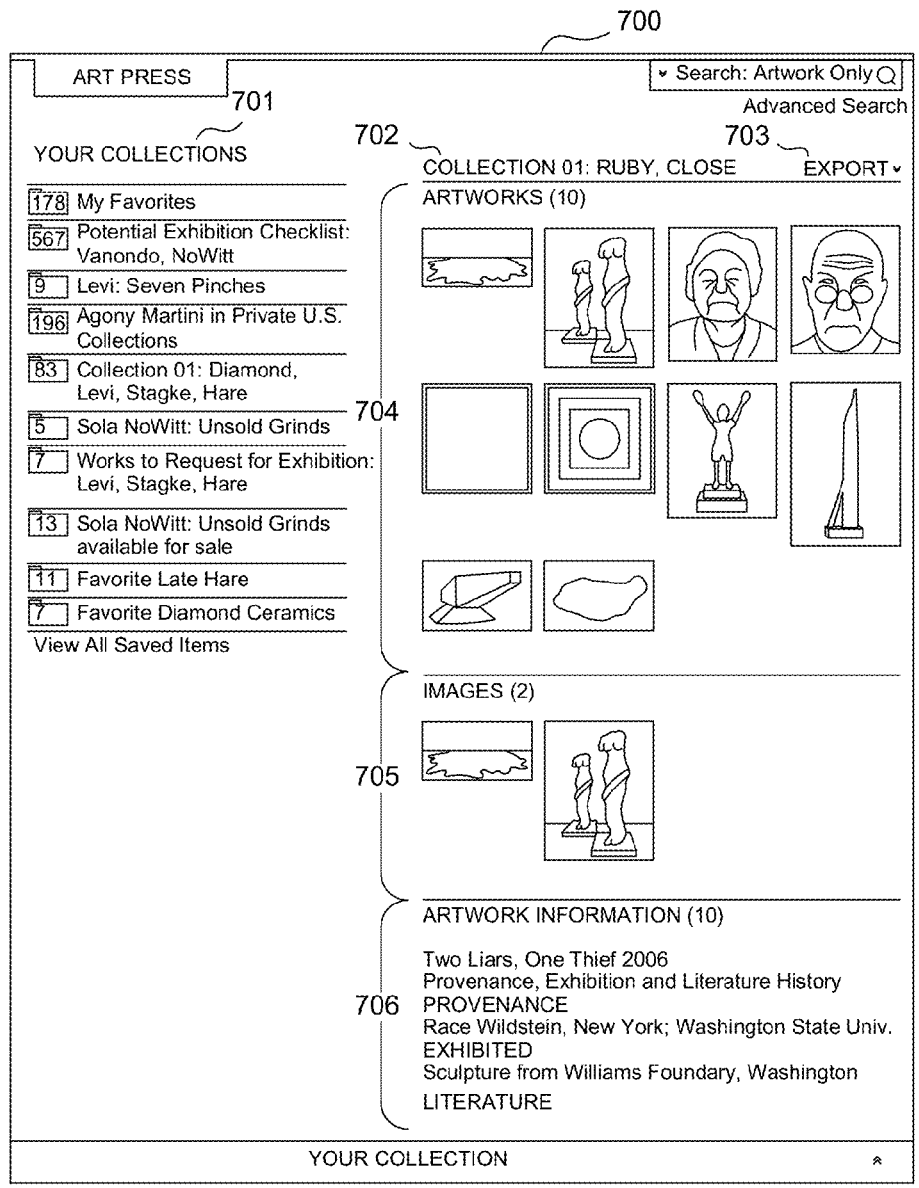
FIG. 7 shows an example view of information from a public digital catalogue raisonnés being displayed.

FIG. 7 shows a collection view 700 of collections of artwork from various public CRs. In the digital CR platform, collections can be created based on artwork data stored by the content management system. Collections can incorporate content other than artwork, including exhibitions and publications. For example, a collection can be made up of certain of an artist's artworks, exhibitions of that artwork, and publications related to the artwork.

Collections can be user-defined. For example, an artist can categorize certain of his or her artworks into a collection, allowing the artist to display to users a subset of the digital CR of the artist. As another example, a user can categorize artwork from various public CRs into a personal collection of the user. As yet another example, the operator of the digital CR platform can define collections and/or chapters that are viewable only by subscribers.

In part, collection view 700 shows various artwork collections in a collections list 701. In the example of FIG. 7, the collections list 701 is titled "Your Collections," indicating that the list of collections shown is a list that has been defined by a user.

Collection view 700 also includes a collection display 702. Collection display 702 displays a collection that has been selected from collections list 701. Collection display 702 shows various information from the selected collection, including: artwork images 704 of artworks in the collection; supplemental images 705 related to the artworks in a user's private collection; and artwork information 706 pertaining to artworks in the user's private collection, including the works' provenance, exhibition, and related literature.

Collection view 700 also includes export tool 703. Export tool 703 allows a user to export a collection as a self-contained electronic file.

Figure 8:
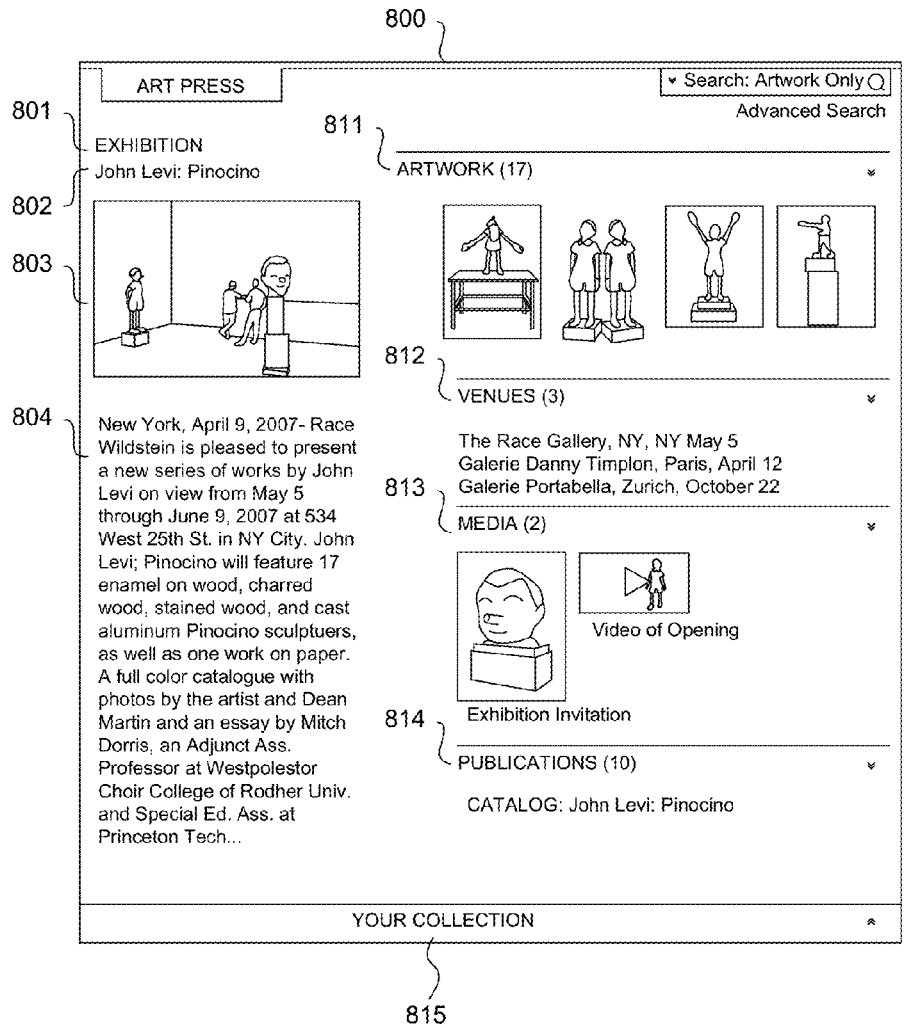
FIG. 8 shows another example view of information from a public digital catalogue raisonnés being displayed.

FIG. 8 shows an exhibition index page 800 of information related to an exhibition of artwork. Because the digital CR platform stores data on exhibitions, a public CR can include data on exhibitions of an artist's work (or containing an artist's work). The exhibition view 800 allows a user to view exhibitions that include artwork in an artist's public CR.

Exhibition view 800 includes an exhibition pane 801 and several supplemental panes 811 through 814. Exhibition pane 801 includes the title 802 of the exhibition, an image 803 of the exhibition, and descriptive text 804 providing information about the exhibition.

Supplemental panes 811 through 814 provide other information from the artist's public CR. The information (e.g., images, files, text) in the supplemental panes can be obtained from the artist's public CR or the artist's digital CR. Artwork pane 811 shows images of the artist's artworks displayed in the exhibition. Venues pane 812 show locations where the exhibition is being displayed. Media pane 513 contains digital media files related to the exhibition. Publications pane 514 shows publications related to the exhibition.

Figure 9:
FIG. 9 shows an example view of a search page from a public digital catalogue raisonnés.

FIG. 9 shows a search page 900 that can be displayed when a user chooses to search for artwork within one or more public CRs. Search page 900 includes a type limiter 901 and a property selector 902. Type limiter 901 allows a user to limit search results to be limited to a type such as artwork, media, or text. Property selector 902 allows a user to further limit search results by selecting specific properties for the search results, such as the artwork period, its medium, its location, terms associated with the artist, or artist exhibitions. Search page 900 also shows search results, which are displayed as artwork results 903, media results 904, and text results 905.

The Private CR Manager and the Admin UI

The private CR manager is an application (or a collection of applications) supported by the content management system of the digital CR platform. The private CR manager manages digital CRs, i.e., creating, uploading, editing, storing, and accessing a digital CR and its associated content.

Users access the functionality of the private CR manager through the admin UI. The admin UI provides access, through the private CR manager, to the databases of the content management system. Using the admin UI, a user can thus create, edit, and control the database records of a digital CR. A user can also publish a digital CR as a public CR using functions available through admin UI. However, as discussed above, in example configurations, different features of the admin UI may be available to different users, and not all features and/or functionalities of the admin UI may be available to any particular user.

In an example embodiment of the invention, the private CR manager includes an administrator tool and a catalogue raisonné tool. Accordingly, admin UI access to the private CR manager includes access to the administrator tool and the catalogue raisonné tool.

The Administrator Tool

The administrator tool allows a user to manage all digital CRs on the digital CR platform. This includes controlling public users' levels of access to public CRs and private users' levels of access to digital CRs (and corresponding public CRs), including controlling what particular content is available to the various access levels. Access levels can be set, for example, to public (available to all users), subscriber (available to subscribers), private (available to no users, to certain classes or designations of users, or to selected users), or unpublished (work in progress). Managing all digital CRs also includes creating new digital CRs and deleting existing digital CRs. In creating a new digital CR with the administrator tool, a user can customize its basic framework, such as the form of database records that make up the digital CR (e.g., a user can add, erase, or edit headers of data fields for records).

The administrator tool also allows a user to manage the ways access is provided to the users of the digital CR platform, including public users, subscribers, and private users. Examples of managing the access of users include: creating a new subscription service, deleting a private user, providing a public user access as a subscriber, or changing the permissions of parts of the database. The administrator tool can further be used to manage the database(s), software, and/or hardware underlying the digital CR platform.

In an example embodiment of the invention, only the operator of the digital CR platform (and/or users under the direction or control of the operator) can access and use the administrator tool. Access to the administrator tool may be restricted in this manner, for example, to provide security for the core functionality controlled by the administrator tool. Thus, only the operator can create and delete digital CRs because that is a function of the administrator tool. In this example embodiment, users who cannot access the administrator tool, such as authorized editors, can nevertheless manage existing digital CRs using the catalogue raisonné tool.

The Catalogue Raisonné Tool

The catalogue raisonné tool generally provides control of a digital CR. The catalogue raisonné tool allows a user to manage an individual digital CR and its content (e.g., creating, editing, and/or deleting data in a database record), as well as multiple digital CRs (i.e., creating, editing, and/or deleting data defining relationships between data in various database records). That a user has access to one digital CR through the catalogue raisonné tool, however, does not necessarily mean that the user can access any other digital CR User management of digital CRs with the catalogue raisonné tool includes managing, i.e., creating, editing, and/or deleting, content for artworks in a digital CR. In other words, at the database level, the user can use the catalogue raisonné tool to manipulate data objects stored in records of the digital CR. In addition to managing content (text, images, media data, and other data) for the artworks in the digital CR, the catalogue raisonné tool can manage database records pertaining to, for example, the artworks' artist, owner, publisher, museum, gallery, and exhibition venue(s).

User management of digital CRs also includes uploading files such as image files (e.g., artwork images), media data files (e.g., audio files, video files, and podcasts), and other data. In an example embodiment, to be published as a public CR, a digital CR must include, for each artwork in the catalogue, a primary image of the work, and optionally includes alternate or supplemental images of the work, and images at varying resolutions. These images can be uploaded to the content management system of the digital CR platform using the catalogue raisonné tool.

User management of digital CRs further includes user access to create or view reports on the usage and history of the content for artworks in a digital CR. For example, a user can see when or how many times an image of an artwork has been viewed (in the digital CR and/or a corresponding public CR), or when a digital CR or public CR was last modified. A user also can track changes to content and revert to previous versions of content.

The catalogue raisonné tool further allows a user to publish content and information of a digital CR, i.e., create, update, or edit a public CR. The user can "stage" a digital CR (or content of the digital CR) by viewing, through the catalogue raisonné tool, what will be accessible in the public CR once the digital CR is published. The user also can view the publishing status of the content in a digital CR (e.g., whether the content is published or unpublished). A particular user's access to the catalogue raisonné tool, however, may be limited to certain features or functionalities of the tool. For example, some users may be able to publish content and information of a digital CR but not perform user management tasks (such as those described above), while other users may have opposite access to the tool.

Figure 10A:
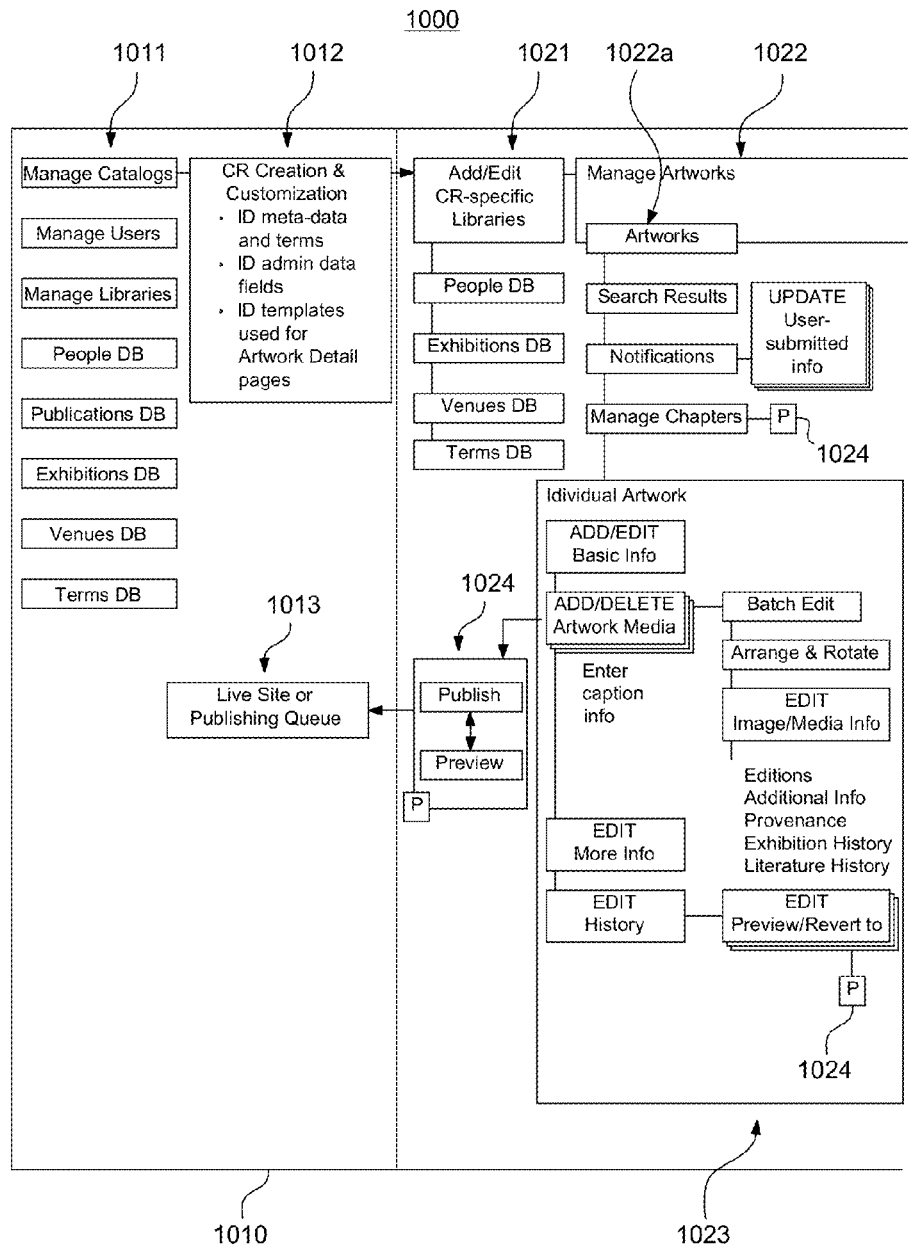
FIGS. 10A and 10B illustrate the functional architecture of a private catalogue raisonné manager in an example embodiment of the invention.
Figure 10B:
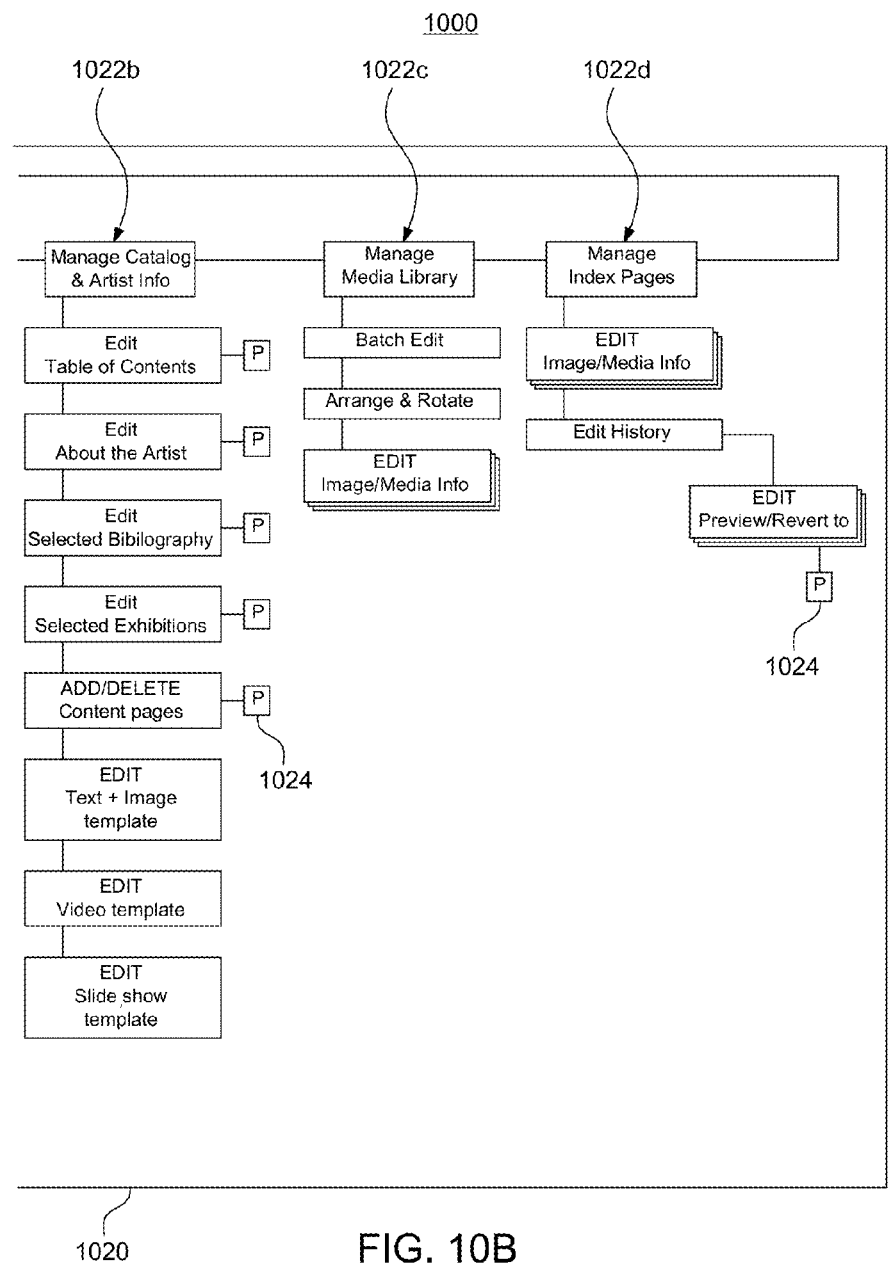

FIGS. 10A and 10B illustrate the functional architecture of a private catalogue raisonné manager 1000 configured according to an example embodiment of the invention. Manager 1000 includes an administrator tool 1010 and a catalogue raisonné tool 1020. Each of the tools includes modules for managing various aspects of the digital CR platform.

Administrator tool 1010 includes a global module 1011, a creator module 1012, and a publisher module 1013. Global module 1011 allows a user to manage digital CRs stored on a content management system, including functions for editing the database(s) underlying the digital CRs and deleting digital CRs. Global module 1011 also allows a user to manage the global libraries of the database(s), such as libraries containing people information, publications information, exhibitions information, venues information, and terms information. Creator module 1012 allows a user to create a new digital CR and customize the framework of the digital CR, including its data model and any templates for pages displayed in a public CR corresponding to the digital CR. Publisher module 1013 allows users of the administrator tool 1010 to publish artwork newly-created or edited and submitted by a user of catalogue raisonné tool 1020.

Catalogue raisonné tool 1020 includes a library module 1021, a digital CR manager module 1022, an artwork module 1023, and a publisher module 1024. The modules of catalogue raisonné tool 1020 generally allow a user to manage a single digital CR, and do not permit the user to access other digital CRs. Depending on the configuration, however, a user may have access to multiple digital CRs.

Library module 1021 allows a user to add and edit local libraries of the digital CR.

Digital CR manager module 1022 provides functionality for managing a digital CR. Manager module 1022 includes artwork manager sub-module 1022a, catalog manager sub-module 1022b, media sub-module 1022c, and page sub-module 1022d.

Sub-module 1022a allows a user to manage artworks in the digital CR, including creating records for new artworks added to the digital CR. Through sub-module 1022a, a user can view and search for artworks in the digital CR, view notifications related to the artworks, including information submitted by other users (e.g., user-uploaded content for the artwork), and to manage chapters of the digital CR.

Sub-module 1022b allows a user to control various aspects of the digital CR. A user can edit various sections of the digital CR, including the table of contents, artist information, bibliography, exhibitions, and other content pages. Sub-module 1022b can also be used to edit templates for digital content such as text, images, videos, and/or slideshows.

Sub-module 1022c allows a user to control media files in the digital CR. Specifically, media files, which are stored in a media library, can be edited, arranged, and rotated. Also, information associated with the media files can be edited.

Sub-module 1022d allows a user to create index pages in the digital CR (e.g., an exhibition index page). Page management includes the ability to edit the page, revert to a previous version, and preview a page before publishing.

Artwork module 1023 provides functionality for editing aspects of individual artworks in the digital CR. A user can add content for artwork, including text, images, and other media files.

Publication module 1024 allows a user to select what information in the digital CR will be included in a public CR, when published, and to submit the selected information for publication. Information selected in publication module 1024 can include new artwork records as well as updates to existing artwork records. Publication module 1024 includes a preview function to view how the artwork will appear in the public CR before making it available to public users of the digital CR platform.

In an example embodiment of the invention, actual publication of selected and submitted information into a public CR may be controlled in a publisher module 1013 of administrator tool 1010. Thus, a user selection to publish content by publication module 1024 of catalogue raisonné tool 1020 does not automatically cause the content to be available in a public CR. Instead, selection to publish by the module causes the content to be available to publisher module 1013 (e.g., queued in a publishing queue of the module). Users having access to publisher module 1013 then can choose to publish content. Thus, in this embodiment, only users (e.g., the operator of the digital CR platform) having access to administrator tool 1010 (or at least access to publisher module 1013) can directly publish content. Users having access only to functions of catalogue raisonné tool 1020 (e.g., an artist or an authorized editor) cannot directly publish content.

Functions associated with publication module 1024 are included in other modules of the catalogue raisonné tool 1020. Specifically, the digital CR manager 1022 and artwork module 1023 include publishing functions 1024, as shown in FIGS. 10A and 10B.

In an example embodiment, the catalogue raisonné tool includes an approval function. The approval function requires a particular user (or users) to review and approve changes to a digital CR (or certain content in the digital CR) before the changes can be published in the public CR. The particular user can be, for example, an artist whose artwork is the subject of the digital CR, any authorized editor, or certain authorized editors previously approved by the artist.

In an example embodiment, the catalogue raisonné tool also includes a digital asset management function. This function allows a user to watermark or otherwise protect (i.e., secure or identify ownership of) content that is uploaded to or created on the content management system of the digital CR platform.

In an example embodiment, only the operator of the digital CR platform (and/or users under the direction or control of the operator) and authorized editors can access and use the catalogue raisonné tool. Thus, in this embodiment, other private users cannot access the functionality provided by the administrator tool or the catalogue raisonné tool.

FIGS. 11, 12A, and 12B show example views of the display of information from the admin UI. FIGS. 11, 12A and 12B generally illustrate how functions of the private CR manager can be displayed to a user. In particular, the views in these figures show information in the form it is presented to a user by, for example, a web browser or other application that can display information transmitted over a network.

FIG. 11 shows an artworks list view 1100. View 1100 may be associated with artwork manager sub-module 1022a of FIGS. 10A and 10B, for example. Artworks view 1100 contains the artworks of a digital CR. The artworks are listed under an artwork heading 1101. Heading 1101 includes subheadings for artwork name 1101a, edit log 1101b, edit information 1101c, and publishing information 1101d. In turn, each artwork listing 1102 includes the information for that artwork, separated according to the subheadings of heading 1101.

Artworks view 1100 also provides other functionality for a user. A user can choose to submit for publication 1103 user-selected artwork of the digital CR in a corresponding public CR. Conversely, a user can choose to un-publish 1104 user-selected artworks. A user can also choose to delete 1105 or add 1106 artworks.

FIGS. 12A and 12B show an individual artwork view 1200. View 1200 may be associated with artwork module 1023 of FIGS. 10A and 10B. Individual artwork view 1200 allows a user to enter various kinds of information about an artwork, including the work's title, creation date, and description. The information entered in view 1200 can be stored in a database record such as artwork record 111 of FIGS. 1A through 1C.

Figure 13A:

FIGS. 13A and 13B show another individual artwork view 1300. View 1300 is similar to the view shown in FIGS. 12A and 12B, and also may be associated with artwork module 1023. In view 1300, however, information about the artwork, such as its title, catalogue number, edition, and category, has already been created. Thus, view 1300 may be associated with the editing of information already stored in a digital CR.

Figure 14A:
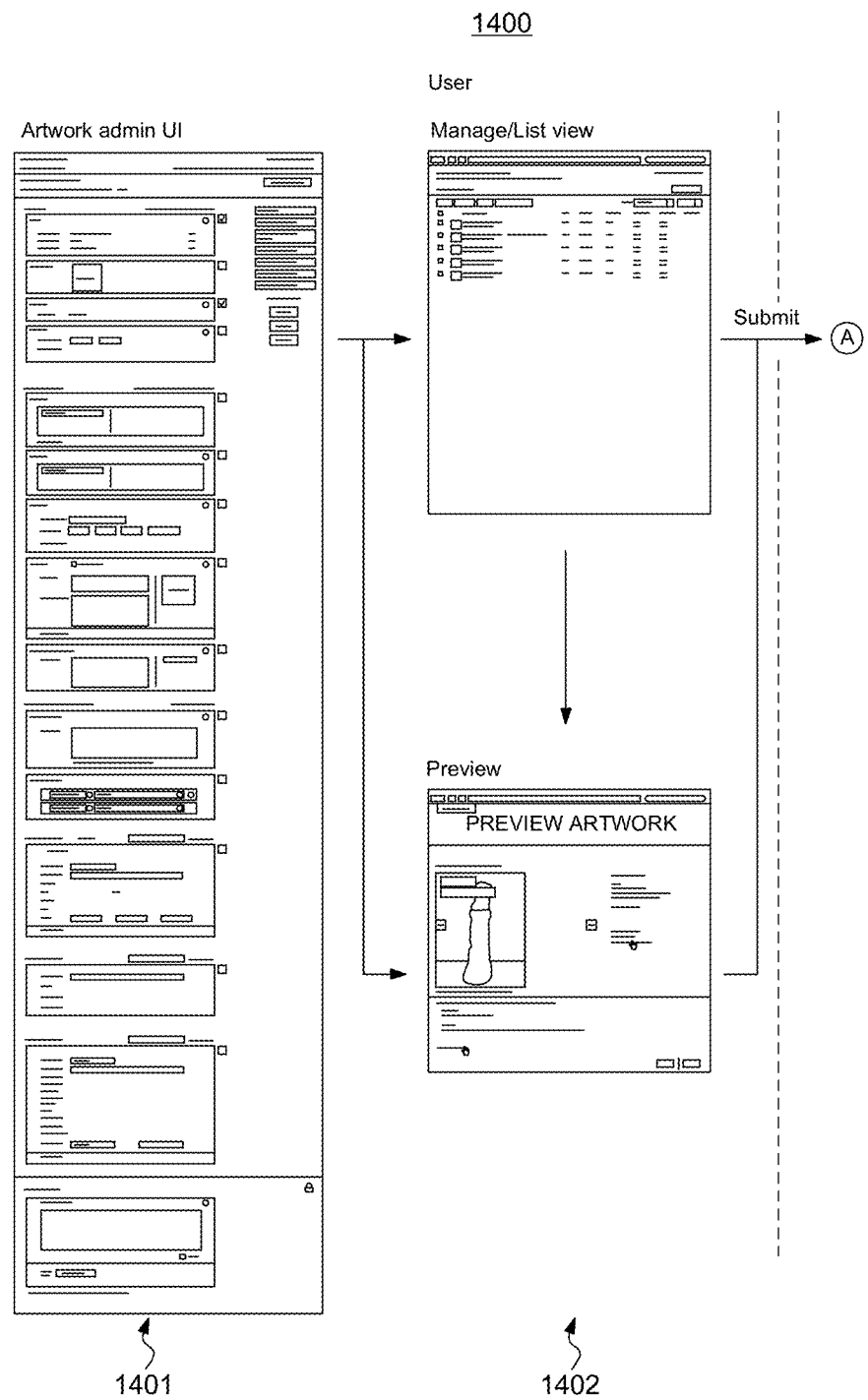
FIGS. 14A and 14B illustrate a workflow for publishing information to a public CR, according to an example embodiment of the invention.
Figure 14B:
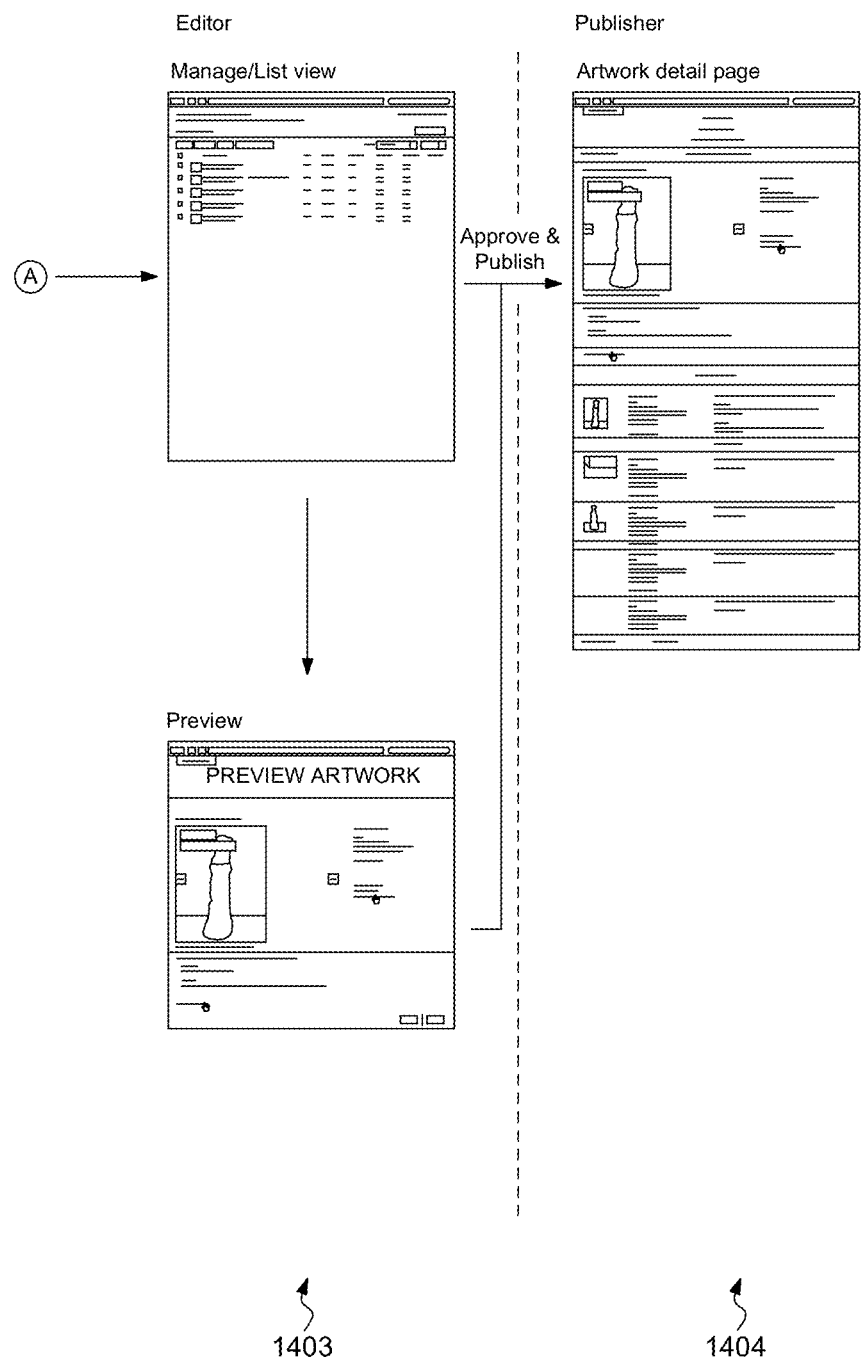

FIGS. 14A and 14B illustrate a workflow for publishing information to a public CR, according to an example embodiment of the invention. At step 1401, information about an artwork is created (or edited) by a user and stored in a digital CR, and at least some of that information is designated for the public CR, upon publication. At step 1402, the user is able to manage the changes made to the artwork and any other changes made to other artworks (not shown), and submit those changes for approval (by, e.g., an editor). At step 1402, the user also can choose to preview the changes for an artwork. At step 1403, an editor can review the submitted changes and choose whether to approve the changes for publication. At step 1404, the changes are published in the public CR.

The admin UI has been described above with reference to example embodiments in which the administrator tool and the catalogue raisonné tool perform various functions of the private CR manager. This description, although useful to describe to functions of the private CR manger in those embodiments, does not limit the configuration of the private CR Mmanager in other example embodiments of the invention. Rather, in other example embodiments, the functions of the private CR manager can be grouped in other tools or other ways, or not even grouped at all. Thus, the references to tools in the description above should not be regarded as reflecting how the private CR manager is configured in the various example embodiments of the invention.

An Example Digital Catalogue Raisonné Platform

Figure 15:
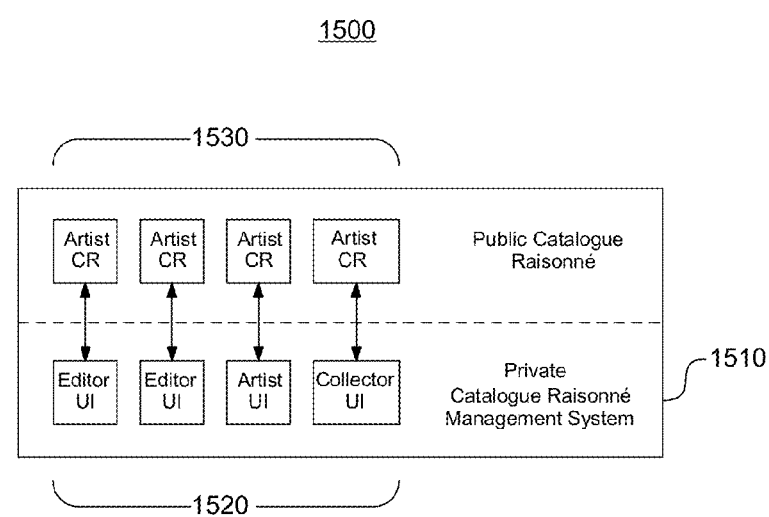
FIG. 15 illustrates a digital catalogue raisonné platform configured according to an example embodiment of the invention.

FIG. 15 illustrates a digital CR platform 1500 configured according to an example embodiment of the invention. In this example embodiment, digital CR platform 1500 includes private CR manager 1510, admin UIs 1520, and public CRs 1530.

The functionality of private CR manager 1510 can be accessed through the various admin UIs 1520. Admin UIs 1520 include editor UIs (the user interfaces presented to authorized editors), an artist UI (the user interface presented to an artist), and a collector UI (the user interface presented to an art collector). Each of the admin UIs 1520 can present varying functionality of private CR manager 1510 to the individual user. Digital CR platform 1500 can be configured with additional admin UIs, such as UIs for museums, galleries, and other art institutions.

For example, through the editor UI, an authorized editor can store and manage information, such as digital CRs and their associated content, in the central management system. The editor UI provides access to functions of private CR manager 1510, allowing the authorized editor to input, edit, and publish data, e.g., public CRs 1530, including attaching images and other information to records.

Through the artist UI, an artist can manage (or participate in) the creating and editing of the artist's digital CR. The artist can send content and other information, and notify other users (e.g., authorized editors of submitted content). The artist also can curate images associated with his or her digital CR, and alter the presentation design of the corresponding public CR 1530.

The artist UI also allows the artist to review content submitted by others for accuracy and/or approve it for digital display or publishing. In an example embodiment of the invention, the artist UI further allows an artist to review and approve image licensing requests.

Through the collector UI, a collector can submit information indicating ownership of artworks in the digital CR, review and approve image licensing requests, and submit content related to digital CRs for approval. The collector UI may also allow a collector to register his or her ownership of artworks with the digital CR platform.

Although not shown in FIG. 15, in other example embodiments, private CR manager 1510 can include additional admin UIs, such as a museum UI for museum personnel and a gallery UI for galleries.

External Services Provided by a Digital CR Platform

A digital CR platform can provide services in addition to those described above. The additional services utilize the digital nature of the digital CRs to provide functionality not available with traditional printed catalogues raisonnés. However, because these services are not part of the content management system of the digital CR platform, they are referred to as "external services."

One external service is an image licensing service. Using the public UI, a user can browse or search public CRs to view an artist's artworks and initiate a copyright and/or image rights request by selecting an individual artwork directly from a web page displaying the artwork (or information about the artwork).

An image rights (or copyright) request, through the image licensing service, can require the user (as requestor of the rights) to provide additional information relating to the scope of the license requested (e.g., the number of copies of the image, how the image will be used, the territorial distribution of the copies, the image quality of the copies, etc.).

The image licensing service can include functions for the owners of copyrights in artworks (e.g., artists or artwork purchasers) to provide instructions regarding the price and the accessibility of image rights. For example, the copyright owner can specify certain artworks as being available to any rights licensing request, while specifying other artworks as being available only under certain conditions. A copyright owner may also request notification of each image rights request, and may require the image licensing service to obtain the copyright owner's approval before granting any (or all) image rights requests.

Licensed image downloads can be free or require payment. Payment may be required on a per download basis, or it may be included in the cost of a subscription. When payment is required to download an image, a user may use the payment functions of a public UI, for example.

Figure 16A:
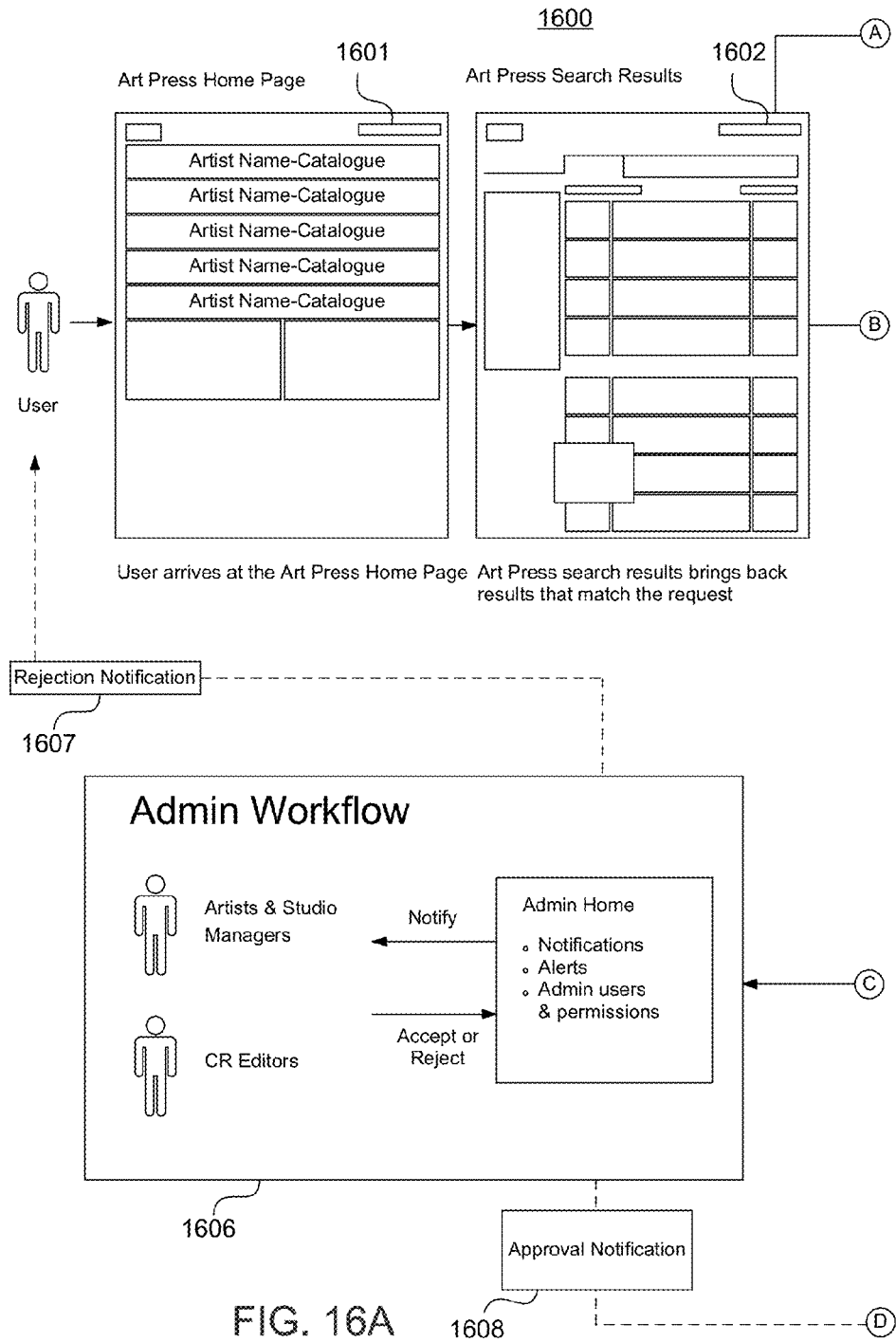
FIGS. 16A and 16B illustrate a workflow of an image rights request according to an example embodiment of the invention.
Figure 16B:
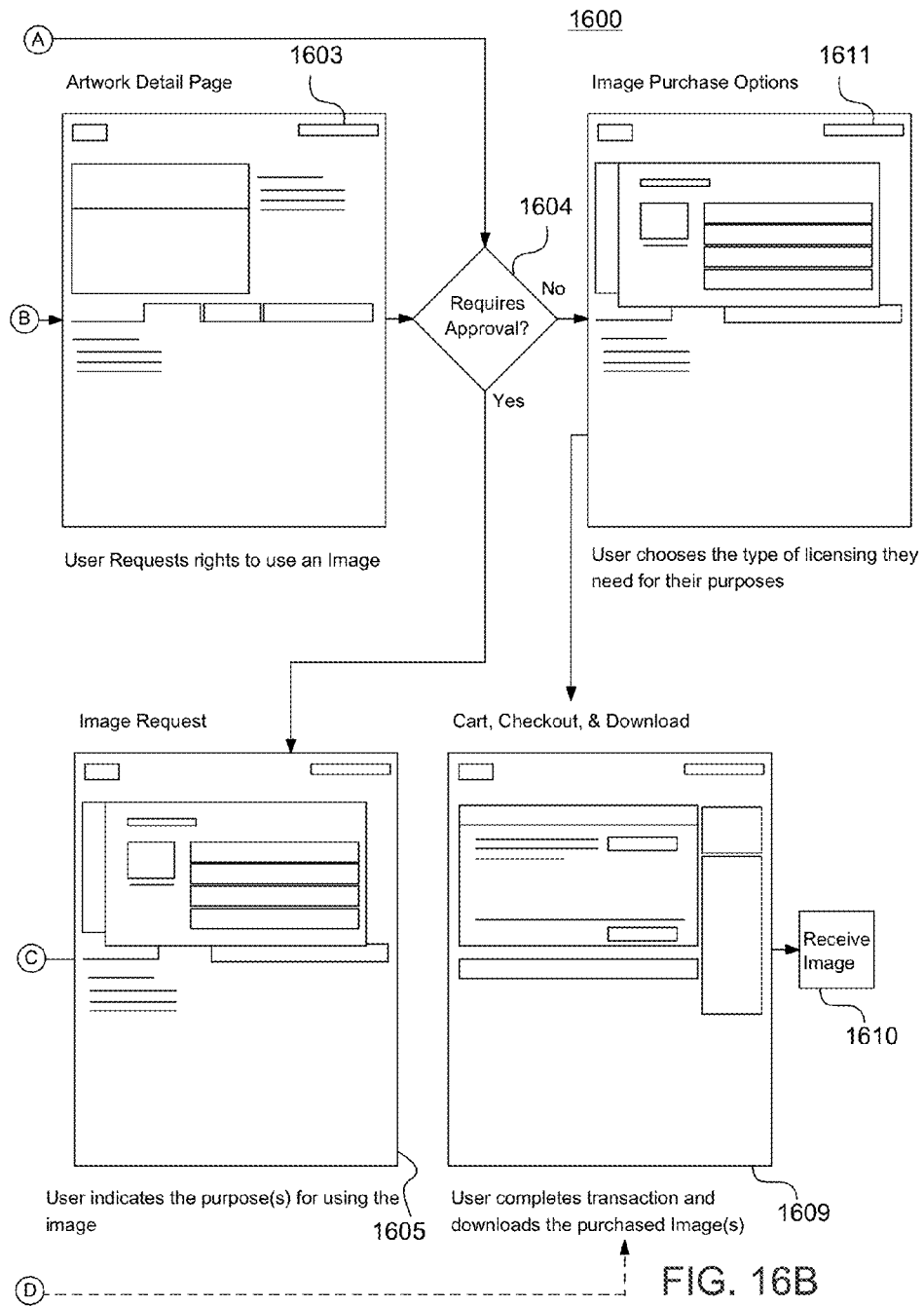

FIGS. 16A and 16B illustrate a workflow of an image rights request 1600 according to an example embodiment of the invention. Image rights request 1600 begins with step

1601, in which a user accesses a home page of the digital CR platform through a public UI. From the home page, the user searches, using a search function on the page, for images of artwork. In step 1602, the results of the search are displayed. As an alternative to steps 1601 and 1602 (and not shown in FIGS. 16A and 16B), however, a user may choose, from the home page, a specific image rights tool or page, which allows a user to select an image.

From the search results, the user may choose to request image rights or select a search result for additional detail. If the user requests image rights from the search results, the workflow reaches a decision block at step 1604. However, if the user selects a search result for additional detail, the user to an intermediate artwork detail page at step 1603. The intermediate artwork detail page includes an option, such as a button, for the user to select to request the rights to the image. Selecting the option causes the workflow to reach the decision block at step 1604.

The decision block at step 1604 determines whether the image rights request requires individual approval of the copyright owner (e.g., the artist) and/or an authorized editor. If the user's image rights request requires individual approval, the workflow proceeds at step 1605 to an image request page. However, if the user's image rights request does not require approval, as may be the case when, for example, the copyright owner has previously approved licensing of the image and has set license prices, the workflow proceeds to step 1611 to a page where image purchase options are presented.

Where the workflow proceeds to step 1605, the user is prompted to provide additional information relating to the scope of the license requested. The user then submits the request, which is passed through the content management system of the digital CR platform to the copyright owner and/or an authorized editor or other suitable private user for approval at step 1606. The owner (and/or other user) reviews the request through the admin UI, and selects to reject or approve the request. If the request is rejected at step 1606, the user is notified at step 1607 and the transaction is not completed. If, however, the request is approved at step 1606, the user is notified at step 1608. The user then is permitted to complete the image rights transaction, at step 1609, and download the purchased image, at step 1610.

Where the workflow proceeds from step 1604 to step 1611, the user is taken to a page where image purchase options are presented. For example, the user may be prompted to select from among several preset licenses of varying scope and price. The user selects a license from the page, and is then permitted to complete the image rights transaction, at step 1609, and download the image, at step 1610.

Of course, an image rights request may require permissions beyond those discussed with regard to FIGS. 16A and 16B. For example, the artist may grant permission to publish an image provided that the artist approves the specific layout of the image. In this case, the image is sent to potential licensee, who must then provide the artist with the intended layout before the license can be approved.

Other external services that can be provided by the digital CR platform include an owner registry allowing owners of artwork to identify and claim ownership of artworks in the digital CRs, and a studio management service that allows artists to manage their own studios.

External Services Provided by Third Parties

In addition to external services provided by the digital CR platform, other external services can be provided by third parties using content (or other information) provided by the digital CR platform. These third-party services also rely on the digital nature of the digital CRs.

One third-party service is a press package service. This service can allow a user to download a press package about an artist. A press package can include the artist's biography, press clippings, and other public relations material. The service can also allow a user to make special press requests (e.g., requests for interviews or speaking engagements).

Other third-party services include a print-on-demand (POD) service, a service allowing artists and others to create virtual galleries, and a service allowing artists to produce their own websites.

Computer Readable Medium Implementation

The example embodiments described above such as, for example, the systems, interfaces, databases, and procedures depicted in or discussed in connection with any of the preceding figures, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers, smartphones, tablet computers, and similar devices.

Figure 17:
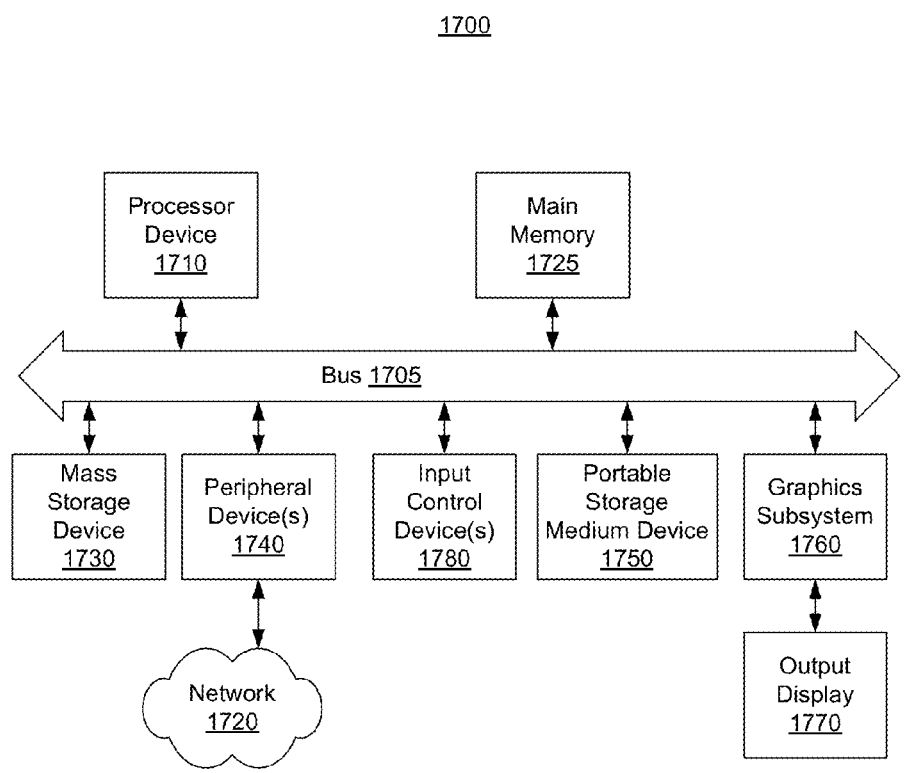
FIG. 17 is a block diagram of a general and/or special purpose computer, in accordance with some of the example embodiments of the invention.

FIG. 17 is a block diagram of a general and/or special purpose computer 1700, in accordance with some of the example embodiments of the invention. The computer 1700 may be, for example, a user device, a user computer, a client computer and/or a server computer, among other things.

The computer 1700 may include without limitation a processor device 1710, a main memory 1725, and an interconnect bus 1705. The processor device 1710 may include without limitation a single microprocessor, or may include a plurality of microprocessors for configuring the computer 1700 as a multi-processor system. The main memory 1725 stores, among other things, instructions and/or data for execution by the processor device 1710. The main memory 1725 may include banks of dynamic random access memory (DRAM), as well as cache memory.

The computer 1700 may further include a mass storage device 1730, peripheral device(s) 1740, portable storage medium device(s) 1750, input control device(s) 1780, a graphics subsystem 1760, and/or an output display 1770. For explanatory purposes, all components in the computer 1700 are shown in FIG. 17 as being coupled via the bus 1705. However, the computer 1700 is not so limited. Devices of the computer 1700 may be coupled via one or more data transport means. For example, the processor device 1710 and/or the main memory 1725 may be coupled via a local microprocessor bus. The mass storage device 1730, peripheral device(s) 1740, portable storage medium device(s) 1750, and/or graphics subsystem 1760 may be coupled via one or more input/output (I/O) buses. The mass storage device 1730 may be a nonvolatile storage device for storing data and/or instructions for use by the processor device 1710. The mass storage device 1730 may be implemented, for example, with a magnetic disk drive or an optical disk drive. In a software embodiment, the mass storage device 1730 is configured for loading contents of the mass storage device 1730 into the main memory 1725.

The portable storage medium device 1750 operates in conjunction with a nonvolatile portable storage medium, such as, for example, a compact disc read only memory (CD-ROM), to input and output data and code to and from the computer 1700. In some embodiments, the software for storing an internal identifier in metadata may be stored on a portable storage medium, and may be inputted into the computer 1700 via the portable storage medium device 1750. The peripheral device(s) 1740 may include any type of computer support device, such as, for example, an input/output (I/O) interface configured to add additional functionality to the computer 1700. For example, the peripheral device(s) 1740 may include a network interface card for interfacing the computer 1700 with a network 1720.

The input control device(s) 1780 provide a portion of the user interface for a user of the computer 1700. The input control device(s) 1780 may include a keypad and/or a cursor control device. The keypad may be configured for inputting alphanumeric characters and/or other key information. The cursor control device may include, for example, a mouse, a trackball, a stylus, and/or cursor direction keys. In order to display textual and graphical information, the computer 1700 may include the graphics subsystem 1760 and the output display 1770. The output display 1770 may include a cathode ray tube (CRT) display and/or a liquid crystal display (LCD). The graphics subsystem 1760 receives textual and graphical information, and processes the information for output to the output display 1770.

Each component of the computer 1700 may represent a broad category of a computer component of a general and/or special purpose computer. Components of the computer 1700 are not limited to the specific implementations provided here.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a non-transitory storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method for creating a digital art catalogue, the method comprising:
   receiving, at a first user interface of a content management system, first digital data for at least one artist, the content management system having at least one computer, and the first digital data including at least one of an image of an artwork of the at least one artist and a description of the artwork;
   storing the first digital data in at least one database of the content management system;
   transmitting, through the first user interface, information permitting a user to provide (a) a command to the content management system to make available, at the first user interface, a first version of a digital art catalogue, wherein the digital art catalogue includes the first digital data, and (b) a command to the content management system to make available, at the first user interface and a second interface of the content management system, a second version of the digital art catalogue; and
   receiving, at the first user interface, the command to make available the first version of the digital art catalogue and the command to make available the second version of the digital art catalogue,
   wherein the second user interface is an interface other than the first user interface.

2. The method according to claim 1, the method further comprising:
   retrieving, by the content management system, the first digital data from the at least one database, said retrieving occurring after said transmitting;
   transmitting, through the first user interface, the retrieved first digital data and information permitting the user to provide another command to the content management system to delete the first digital data;
receiving, through the first user interface, the command to delete the first digital data;
deleting, by the content management system, the first digital data from the at least one database;
receiving, at the first user interface, second digital data for the at least one artist, the second digital data including at least one of an image of the artwork of the at least one artist and a description of the artwork;
storing the second digital data in the at least one database;
transmitting, through the first user interface, information permitting a user to provide another command to the content management system to make available, at the first and second user interfaces, a version of a digital art catalogue including the second digital data; and
receiving, at the first user interface, the command to make available the version of the digital art catalogue including the second digital data.

3. The method according to claim 1, the method further comprising:
receiving, at the first user interface, second digital data for the at least one artist, the second digital data including at least one of an image of the artwork of the at least one artist and a description of the artwork;
storing the second digital data in the at least one database;
transmitting, through the first user interface, information permitting a user to provide another command to the content management system to make available, at the first and second interfaces, a version of a digital art catalogue including the first and second digital data; and
receiving, at the first user interface, the command to make available the version of the digital art catalogue including the first and second digital data.

4. The method according to claim 1,
wherein the first digital data further includes data containing a title of the artwork, a creation date of the artwork, a medium of the artwork, and dimensions of the artwork.

5. The method according to claim 1, further comprising:
receiving, at the second user interface, a request for the second version of the digital art catalogue; and
transmitting, through the second user interface, the second version of the digital art catalogue,
wherein the second version of the digital art catalogue includes, for at least one artwork of the at least one artist, one of an image of the at least one artwork and a description of the at least one artwork.

6. A content management system for creating a digital art catalogue, the content management system comprising:
at least one computer;
a digital art catalogue manager configured to instruct at least one database to store first digital data for at least one artist, the first digital data including at least one of an image of an artwork of the at least one artist and a description of the artwork;
a first user interface; and
a second user interface,
wherein the first user interface is configured to
(i) receive the first digital data,
(ii) transmit information permitting a user to provide (a) a command to the content management system to make available, at the first user interface, a first version of a digital art catalogue, wherein the digital art catalogue includes the first digital data, and (b) a command to the content management system to make available, at the first and second user interfaces, a second version of the digital art catalogue, and
(iii) receive the command to make available the first version of the digital art catalogue and the command to make available the second version of the digital art catalogue.

7. The content management system according to claim 6,
wherein the digital art catalogue manager is further configured to
(i) retrieve the first digital data from the at least one database, and
(ii) instruct the at least one database to delete the first digital data and store second digital data, the second digital data including at least one of an image of the artwork of the at least one artist and a description of the artwork, and
wherein the first user interface is further configured to
(iv) transmit, to a user, the first digital data and information permitting the user to provide a command to delete the first digital data,
(v) receive the command to delete the first digital data,
(vi) receive the second digital data,
(vii) transmit information permitting a user to provide another command to the content management system to make available, at the first and second user interfaces, a version of a digital art catalogue including the second digital data, and
(vii) receive the command to make available the version of the digital art catalogue including the second digital data.

8. The content management system according to claim 6,
wherein the digital art catalogue manager is further configured to instruct the at least one database to store second digital data for the at least one artist, the second digital data including at least one of an image of the artwork of the at least one artist and a description of the artwork, and
wherein the first user interface is further configured to
(iv) receive the second digital data,
(v) transmit information permitting a user to provide another command to the content management system to make available, at the first and second user interfaces, a version of the digital art catalogue including the first and second digital data, and
(vi) receive the command to make available the version of the digital art catalogue including the first and second digital data.

9. The content management system according to claim 6,
wherein the first user interface is further configured to receive digital data containing a title of the artwork, a creation date of the artwork, and a catalogue number of the artwork.

10. The content management system according to claim 6,
wherein the second user interface is configured to
(i) receive a request for the second version of the digital art catalogue, and
(ii) transmit the second version of the digital art catalogue, and
wherein the second version of the digital art catalogue includes, for at least one artwork of the at least one artist, one of an image of the at least one artwork and a description of the at least one artwork.

11. A non-transitory computer-readable medium storing instructions which, when executed by a processor, cause the processor to perform:

receiving, at a first user interface, first digital data for at least one artist, the first digital data including at least one of an image of an artwork of the at least one artist and a description of the artwork;

storing the first digital data in at least one database;

transmitting, through the first user interface, information permitting a user to provide (a) a command to make available, at the first interface, a first version of a digital art catalogue, wherein the digital art catalogue includes the first digital data, and (b) a command to make available, at the first user interface and a second user interface, a second version of the digital art catalogue; and receiving, at the first user interface, the command to make available the first version of the digital art catalogue and the command to make available the second version of the digital art catalogue, wherein the second user interface is an interface other than the first user interface.

12. The non-transitory computer-readable medium according to claim 11, the instructions further comprising:

retrieving the first digital data from the at least one database, said retrieving occurring after said transmitting;

transmitting, through the first user interface, the retrieved first digital data and information permitting the user to provide another command to delete the first digital data;

receiving, through the first user interface, the command to delete the first digital data;

deleting the first digital data from the at least one database;

receiving, at the first user interface, second digital data for the at least one artist, the second digital data including at least one of an image of the artwork of the at least one artist and a description of the artwork;

storing the second digital data in the at least one database;

transmitting, through the first user interface, information permitting a user to provide another command to make available, at the first and second user interfaces, a version of a digital art catalogue including the second digital data; and receiving, at the first user interface, the command to make available the version of the digital art catalogue including the second digital data.

13. The non-transitory computer-readable medium according to claim 11, the instructions further comprising:

receiving, at the first user interface, second digital data for the at least one artist, the second digital data including at least one of an image of the artwork of the at least one artist and a description of the artwork;

storing the second digital data in the at least one database;

transmitting, through the first user interface, information permitting a user to provide another command to make available, at the first and second user interfaces, a version of a digital art catalogue including the first and second digital data; and receiving, at the first user interface, the command to make available the version of the digital art catalogue including the first and second digital data.

14. The non-transitory computer-readable medium according to claim 11, wherein the first digital data further includes data containing a title of the artwork, a creation date of the artwork, a medium of the artwork, and dimensions of the artwork.

15. The non-transitory computer-readable medium according to claim 11, the instructions further comprising:

receiving, at the second user interface, a request for the second version of the digital art catalogue; and transmitting, through the second user interface, the second version of the digital art catalogue, wherein the second version of the digital art catalogue includes, for at least one artwork of the at least one artist, one of an image of the at least one artwork and a description of the at least one artwork.

16. A process comprising:

receiving, from a user interface, a request to publish a digital content record, wherein the publishing of the digital content record requires receiving an approval;

receiving the approval to publish the digital content record;

publishing, by a content management system, the digital content record;

receiving, from the user interface, (i) a change to a first component of the digital content record, (ii) a change to a second component of the digital content record, and (iii) a request to publish the changes to the first and second components, wherein publishing the change to the first component does not require receiving an approval, and wherein publishing the change to the second component requires receiving an approval;

publishing, by the content management system, the change to the first component;

receiving approval to publish the change to the second component; and publishing, by the content management system, the change to the second component.

17. A process according to claim 16, further comprising:

receiving, from the user interface, (i) first and second new components of the digital content record and (ii) a request to publish the first and second new components, wherein publishing the first new component does not require receiving an approval, and wherein publishing the second new component requires receiving an approval;

publishing, by the content management system, the first new component;

receiving the approval to publish the second new component; and publishing, by the content management system, the second new component.

* * * * *